United States Patent
Kurt et al.

(10) Patent No.: US 12,273,744 B2
(45) Date of Patent: Apr. 8, 2025

(54) AUTOMATICALLY USING CONFIGURATION MANAGEMENT ANALYTICS IN CELLULAR NETWORKS

(71) Applicant: Samsung Electronics Co., Ltd., Suwon-si (KR)

(72) Inventors: Mehmet N. Kurt, New York, NY (US); Samuel Albert, Robbinsville, NJ (US); Yan Xin, Princeton, NJ (US); Russell Douglas Ford, San Jose, CA (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 17/814,186

(22) Filed: Jul. 21, 2022

(65) Prior Publication Data

US 2023/0047057 A1     Feb. 16, 2023

Related U.S. Application Data

(60) Provisional application No. 63/228,481, filed on Aug. 2, 2021.

(51) Int. Cl.
  *H04W 24/02*     (2009.01)
  *H04L 41/0823*   (2022.01)
  *H04L 41/5009*   (2022.01)

(52) U.S. Cl.
  CPC ......... *H04W 24/02* (2013.01); *H04L 41/0823* (2013.01); *H04L 41/5009* (2013.01)

(58) Field of Classification Search
  CPC ............... H04W 24/02; H04L 41/0823; H04L 41/5009
  See application file for complete search history.

(56) References Cited

U.S. PATENT DOCUMENTS

| | | | |
|---|---|---|---|
| 9,119,086 B1 * | 8/2015 | Ouyang | H04L 41/5009 |
| 9,204,319 B2 | 12/2015 | Ouyang et al. | |
| 9,503,919 B2 | 11/2016 | Sofuoglu et al. | |
| 9,538,401 B1 * | 1/2017 | Ouyang | H04W 16/22 |
| 10,735,287 B1 | 8/2020 | Soundrarajan | |

(Continued)

FOREIGN PATENT DOCUMENTS

WO     2020239203 A1     12/2020

OTHER PUBLICATIONS

International Search Report and Written Opinion issued Oct. 26, 2022 regarding International Application No. PCT/KR2022/011315, 8 pages.

(Continued)

Primary Examiner — Jael M Ulysse

(57) ABSTRACT

A method includes partitioning a set of configuration management (CM) data for one or more cellular network devices into multiple distinct time intervals, each time interval associated with a distinct set of CM settings at the one or more cellular network devices, the CM data comprising multiple CM parameters. The method also includes determining a regression model based on the set of CM data. The method also includes applying the regression model to compute a distinct set of scores and compare the set of scores to estimate whether a performance of the one or more cellular network devices has changed during a second time interval relative to a first time interval.

20 Claims, 13 Drawing Sheets

(56) References Cited

U.S. PATENT DOCUMENTS

| | | | |
|---|---|---|---|
| 10,785,101 | B2 | 9/2020 | Li et al. |
| 10,832,087 | B1* | 11/2020 | Wang ................ G06F 18/2163 |
| 2010/0153543 | A1 | 6/2010 | Lee et al. |
| 2013/0196685 | A1* | 8/2013 | Griff ...................... H04W 24/00 455/456.1 |
| 2015/0289149 | A1* | 10/2015 | Ouyang ................ H04W 16/18 370/252 |
| 2017/0064569 | A1* | 3/2017 | Martone ............ H04L 41/0631 |
| 2017/0272319 | A1* | 9/2017 | Sheen .................. H04W 24/02 |
| 2017/0290024 | A1* | 10/2017 | Ouyang ............. H04L 41/0896 |
| 2018/0006957 | A1* | 1/2018 | Ouyang ................ H04L 43/091 |
| 2018/0227930 | A1* | 8/2018 | Ouyang ................ H04W 24/08 |
| 2018/0324199 | A1* | 11/2018 | Crotinger ............. G06F 16/285 |
| 2019/0028357 | A1* | 1/2019 | Kokkula ............... H04L 41/145 |
| 2019/0102276 | A1* | 4/2019 | Dang ................ G06F 18/24155 |
| 2019/0159048 | A1* | 5/2019 | Feldkamp ............... H04L 43/08 |
| 2019/0306023 | A1* | 10/2019 | Vasseur .................. G06N 20/20 |
| 2020/0012917 | A1 | 1/2020 | Pham et al. |
| 2020/0084087 | A1* | 3/2020 | Sharma ................ H04W 24/08 |
| 2020/0117580 | A1* | 4/2020 | Lekivetz ............... G06F 11/368 |
| 2020/0127901 | A1* | 4/2020 | Hariharan ............ H04B 17/336 |
| 2020/0134441 | A1* | 4/2020 | Suthar ................ G06F 11/3466 |
| 2020/0148395 | A1* | 5/2020 | Zhang .................... G06N 20/10 |
| 2020/0322661 | A1 | 10/2020 | Korte et al. |
| 2020/0382361 | A1 | 12/2020 | Chandrasekhar et al. |
| 2021/0029557 | A1 | 1/2021 | Zeng et al. |
| 2021/0351973 | A1 | 11/2021 | Ford et al. |
| 2022/0022066 | A1* | 1/2022 | Anand Pushkala ... H04L 41/147 |
| 2023/0164029 | A1* | 5/2023 | Mermoud ............ H04L 41/145 709/220 |
| 2024/0211768 | A1* | 6/2024 | Rydén et al. ........... H04L 41/16 |
| 2024/0357379 | A1* | 10/2024 | Gullberg .................. G06N 5/01 |

OTHER PUBLICATIONS

Priyadharshini et al., "Regression model for handover control parameter configuration in LTE-A networks", Computers and Electrical Engineering, No. 72, Jan. 2018, pp. 877-893.

Extended European Search Report issued May 31, 2024 regarding Application No. 22853396.4, 14 pages.

Wikipedia, "Coefficient of determination", downloaded Jul. 8, 2022, 13 pgs. https://en.wikipedia.org/wiki/Coefficient_of_determination.

Wikipedia, "Welch's t-test", downloaded Jul. 8, 2022, 4 pgs. https://en.wikipedia.org/wiki/Welch's_t-test.

Engineering Statistics Handbook, "1.3.5.3. Two-Sample t-Test for Equal Means", downloaded Jul. 8, 2022, 4 pgs. https://www.itl.nist.gov/div898/handbook/eda/section3/eda353.htm.

Wikipedia, "Kullback-Leibler divergence", downloaded Jul. 8, 2022, 21 pgs. https://en.wikipedia.org/wiki/Kullback%E2%80%93Leibler_divergence.

Wikipedia, "Random forest", downloaded Jul. 8, 2022, 12 pgs. https://en.wikipedia.org/wiki/Random_forest.

Scikit-Learn, "Machine Learning in Python", downloaded Jul. 8, 2022, 2 pgs. https://scikit-learn.org/stable/.

Small Cell Forum, "SCF market forecast", document 050.10.6, Jul. 2022, 31 pgs. smallcellforum.org/scf-market-forecast.

Y. Cui et al., "Class-Balanced Loss Based on Effective Number of Samples", IEEE/CVF Conference on Computer Vision and Pattern Recognition (CVPR), 2019, 10 pgs.

C. Zhang et al., "Association Rule Mining: Models and Algorithms", vol. 2307, Springer, 2003, 248 pgs.

* cited by examiner

AUTOMATICALLY USING CONFIGURATION MANAGEMENT ANALYTICS IN CELLULAR NETWORKS

CROSS-REFERENCE TO RELATED APPLICATIONS AND CLAIM OF PRIORITY

The present application claims priority to U.S. Provisional Patent Application Ser. No. 63/228,481, filed on Aug. 2, 2021. The content of the above-identified patent document is incorporated herein by reference.

TECHNICAL FIELD

The present disclosure relates generally to wireless communication systems and, more specifically, the present disclosure relates to a system and method for automatically using configuration management analytics in cellular networks.

BACKGROUND

The size and complexity of today's cellular networks makes their management highly challenging and costly for cellular operators. In cellular networks, a large volume of metadata is generated by network devices such as base stations, core network elements and end-user devices. This metadata includes Performance Management (PM) data (e.g., time-series data such as counters, performance metrics, and measurements), Fault Management (FM) data (e.g., alarm events that indicate a device has entered an erroneous state), and Configuration Management (CM) data (e.g., the configuration parameters and values of various network devices). The CM data may include records of all configuration changes that have been made historically, which is referred to as a CM change log. To maintain good service quality for end-users, operators should continuously monitor network performance benchmarks, such as Key Performance Indicators (KPIs) and Key Quality Indicators (KQIs), for thousands of base stations and other devices in the network.

SUMMARY

The present disclosure relates to wireless communication systems and, more specifically, to a system and method for automatically using configuration management analytics in cellular networks.

In one embodiment, a method includes partitioning a set of configuration management (CM) data for one or more cellular network devices into multiple distinct time intervals, each time interval associated with a distinct set of CM settings at the one or more cellular network devices, the CM data comprising multiple CM parameters. The method also includes determining a regression model based on the set of CM data. The method also includes applying the regression model to compute a distinct set of scores and compare the set of scores to estimate whether a performance of the one or more cellular network devices has changed during a second time interval relative to a first time interval.

In another embodiment, a device includes a transceiver configured to transmit and receive information. The device also includes a processor operably connected to the transceiver. The processor is configured to: partition a set of CM data for one or more cellular network devices into multiple distinct tune intervals, each time interval associated with a distinct set of CM settings at the one or more cellular network devices, the CM data comprising multiple CM parameters; determine a regression model based on the set of CM data; and apply the regression model to compute a distinct set of scores and compare the set of scores to estimate whether a performance of the one or more cellular network devices has changed during a second time interval relative to a first time interval.

In yet another embodiment, a non-transitory computer readable medium includes program code. The program code, when executed by a processor of a device, causes the device to: partition a set of configuration management (CM) data for one or more cellular network devices into multiple distinct time intervals, each time interval associated with a distinct set of CM settings at the one or more cellular network devices, the CM data comprising multiple CM parameters; determine a regression model based on the set of CM data; and apply the regression model to compute a distinct set of scores and compare the set of scores to estimate whether a performance of the one or more cellular network devices has changed during a second time interval relative to a first time interval.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
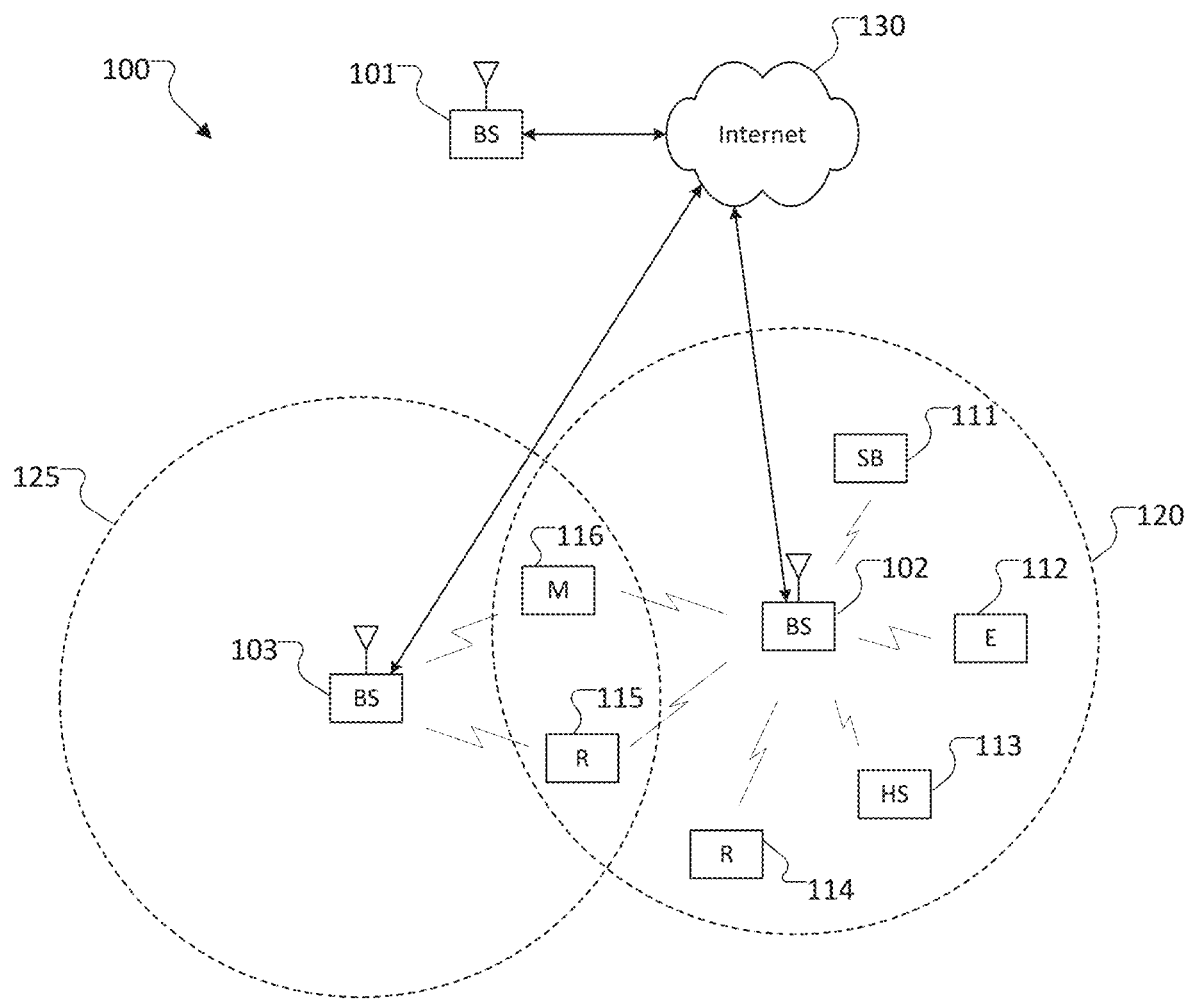
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
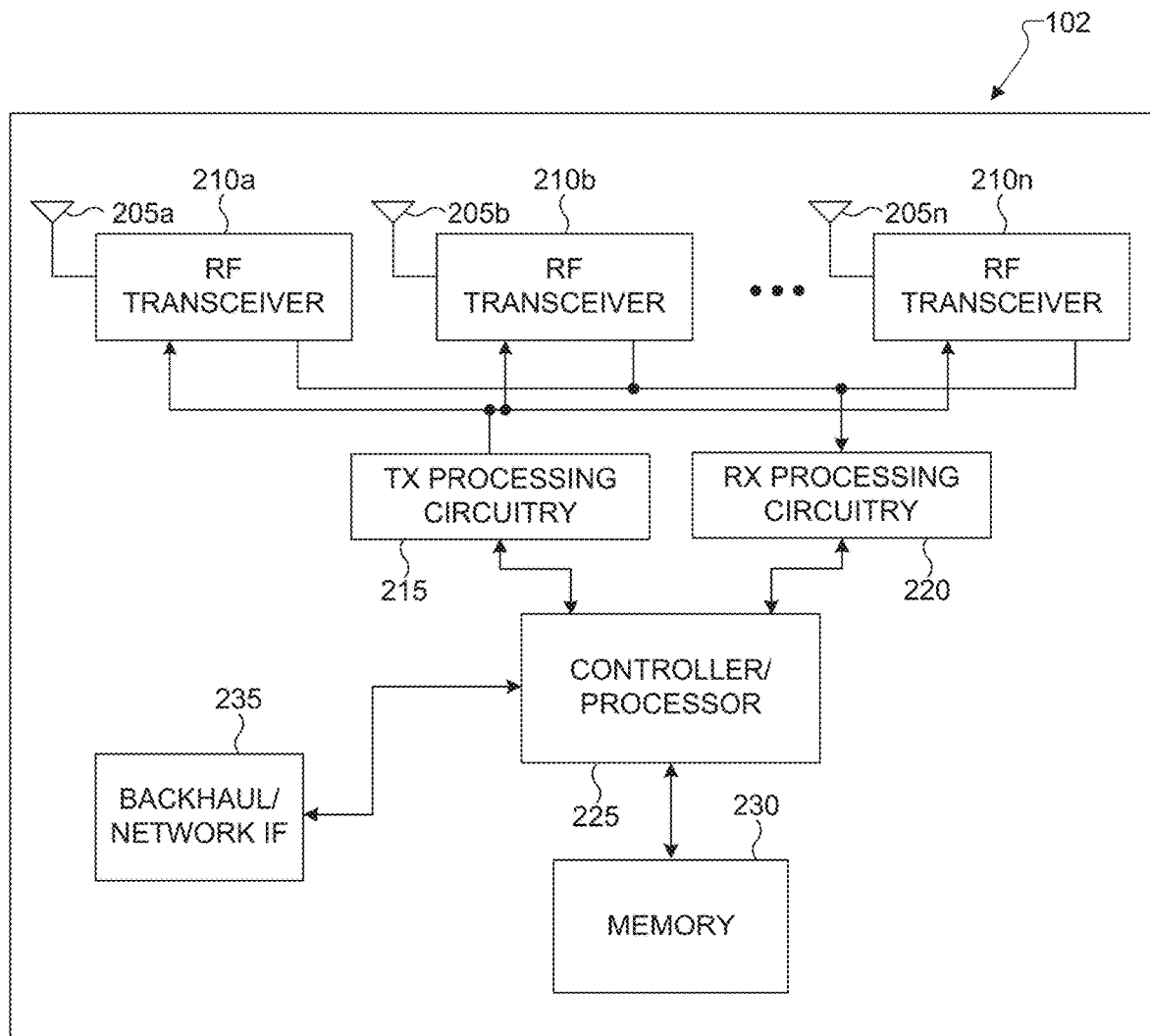
FIG. 2 illustrates an example gNB according to embodiments of the present disclosure.
Figure 3:
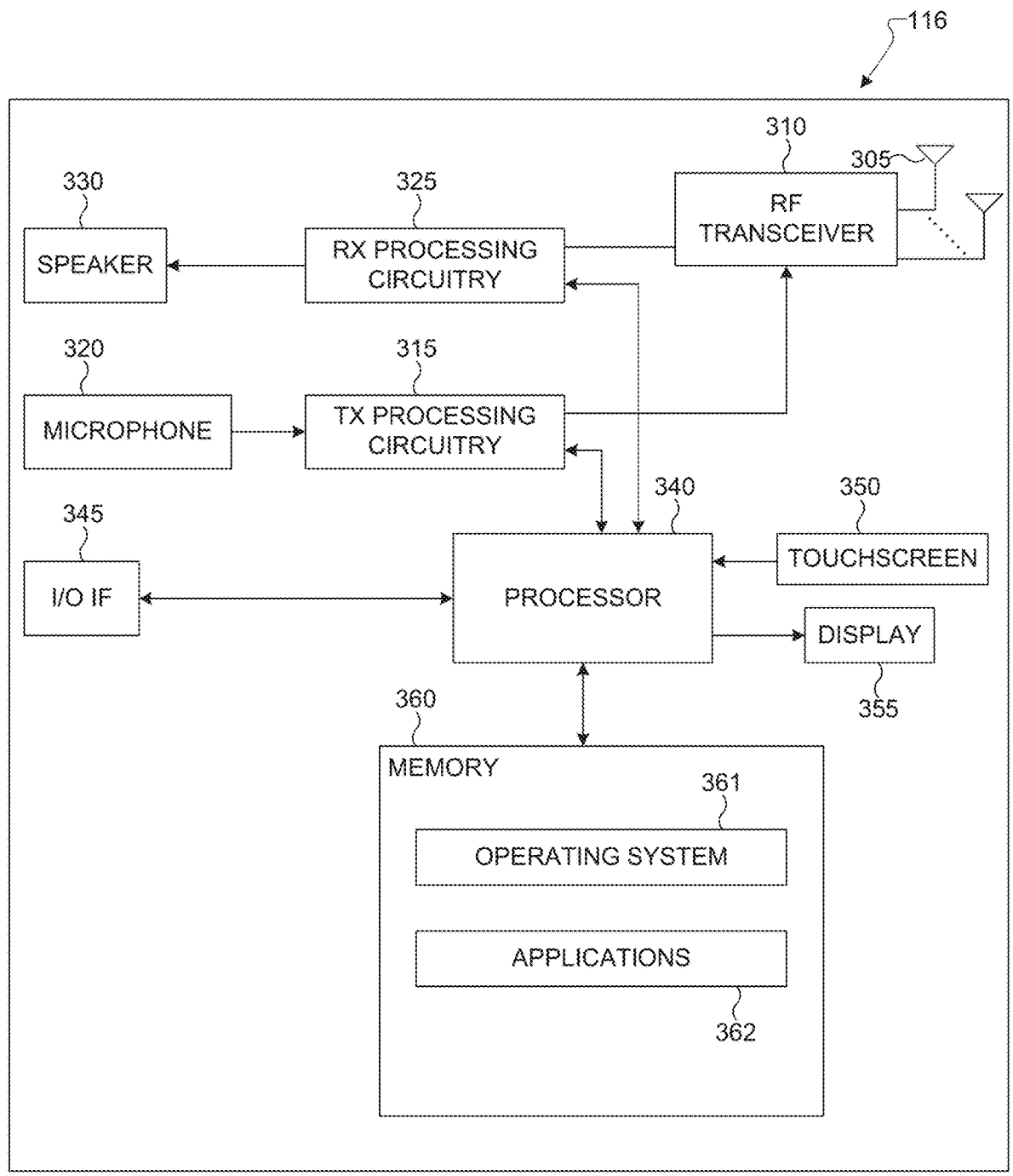
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for implementing a system and method for automatically using configuration management analytics. In certain embodiments, and one or more of the gNBs 101-103 includes circuitry, programming, or a combination thereof for implementing a system and method for automatically using configuration management analytics.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support methods for automatically using configuration management analytics in cellular networks. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for automatically using configuration management analytics in cellular networks. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (CPUs). Also, while FIG. 3 illustrates the UE 116 configured as a mobile telephone or smartphone, UEs could be configured to operate as other types of mobile or stationary devices.

As discussed above, in cellular networks, a large volume of metadata is generated by network devices such as base stations, core network elements and end-user devices. This metadata can include PM data, FM data, and CM data. The CM data may include records of all configuration changes that have been made historically, which is referred to as a CM change log. To maintain good service quality for end-users, operators should continuously monitor network performance benchmarks, such as KPIs and KQIs, for thousands of base stations and other devices in the network.

A typical 4G LTE cell has on the order of a thousand unique configuration parameters, with hundreds more added in the 5G New Radio (NR) cells, which are configured and updated through a CM system. Configuration changes may be made by engineers or automatic background processes such as Self Organizing Network (SON) functions (e.g., the Automatic Neighbor Relation (ANR) function or the automatic Primary Cell ID (PCI) assignment function). Configuration changes are necessary in many cases, such as setting up a new cell deployment, remediating failures and faults, or optimizing the performance of a cell. For example, the antenna tilt may be adjusted to improve coverage or reduce interference to neighboring cells.

With thousands of base stations, each generating hundreds of KPIs and alarms (amounting to hundreds of gigabytes of data each day), and with many configuration parameters, monitoring the network state, diagnosing faults such as caused by erroneous configuration changes, and optimizing the network performance via a proper parameter configuration require huge investments in time and human labor. Moreover, engineers often rely on experience and trial-and-error for configuration management in cellular networks, which may require several iterations of adjusting one or more parameters and observing the impact to network performance over a time period. Therefore, manual optimization of parameters may be imprecise, possibly leading to suboptimal performance.

In summary, in conventional cellular networks, tuning of configuration parameters is often based on a combination of human domain expertise, heuristics, and trial-and-error, which is subject to errors, performance loss, and, in the worst case, network outages or faults, leading to a diminished subscriber experience. Due to the large volume of complex network data, it is challenging and time consuming for engineers to manually monitor all the relevant PM metrics and FM events and analyze the impact of configuration parameters on the network. Moreover, the network performance is likely affected by many factors, such as the environment conditions, and there is a lack of complete information (i.e., unobservable factors). Finally, there are a large number of configuration parameters, and usually a subset of parameters are simultaneously updated in case of a configuration change, which makes it challenging to analyze the impact of each individual parameter. Thus, an intelligent CM analytics system is desired for automated data-driven configuration management, which can speed up the inference and optimization processes, reduce the operational costs, and provide better quality of service for end users.

To address these and other issues, this disclosure provides a system and method for automatically using configuration management analytics in cellular networks. As described in more detail below, cell behavior is statistically captured by a regression model, which is a mapping from selected regressor KPIs and configuration parameters to a target KPI or KQI of interest (e.g., DL throughput). The regressor KPIs are selected such that they do not mask the impact of CM parameters. For example, the regressor KPIs are chosen to be the least dependent on the CM parameters. The disclosed embodiments feature a number of advantageous functions, including (i) parameter recommendation, in which a parameter configuration is recommended to optimize the network performance (i.e., improve one or more target KQIs or KPIs) based on existing cell-level parameter diversity, (ii) root cause analysis to determine if any configuration change has been the cause of a network anomaly, and (iii) parameter sensitivity analysis, in which the impact of individual parameters on the network performance is determined. Note that while some of the embodiments discussed below are described in the context of use in cellular networks, such as radio access networks, these are merely examples. It will be understood that the principles of this disclosure may be implemented in any number of other suitable contexts.

Figure 4:
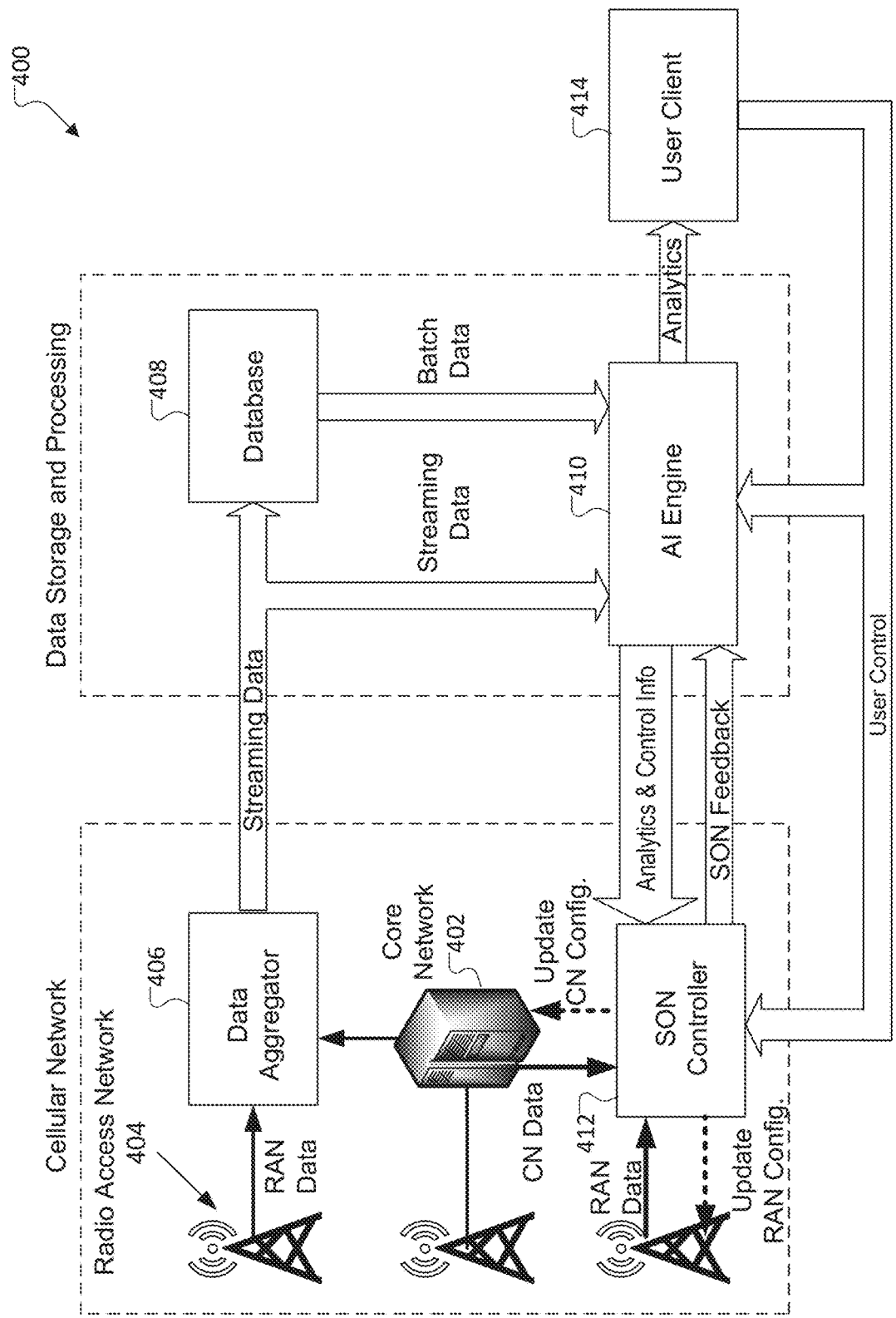
FIG. 4 illustrates an example system for automatically using configuration management analytics in cellular networks according to embodiments of the present disclosure.

FIG. 4 illustrates an example system 400 for automatically using configuration management analytics in cellular networks according to embodiments of the present disclosure. The embodiment of the system 400 shown in FIG. 4 is for illustration only. Other embodiments of the system 400 could be used without departing from the scope of this disclosure.

As shown in FIG. 4, the system 400 includes a cellular network infrastructure, including a core network (CN) 402 and a radio access network (RAN) 404, which serves as a data source for the system 400. The cellular network infrastructure can represent (or be represented by) one or more of the gNBs 101-103 of FIG. 1. The system 400 also includes one or more data aggregators 406, one or more databases 408, an artificial intelligence (AI) engine 410, one or more SON controllers 412, and a user client 414. The user client 414 can represent (or be represented by) one or more of the UEs 111-116 of FIG. 1.

Data from the CN 402 and the RAN 404 may be collected and aggregated at the data aggregator(s) 406, which are intermediate nodes that may also be referred to as Element Management Systems (EMS) or LTE Management Systems (LMS). The RAN data may include measurements, metrics and other data collected from the base station and UE devices. Other collected data may include PM data, FM data, CM data, or a combination of these. PM data can include, e.g., KQIs/KPIs, counters, and metrics, which may be in the form of structured time series data or as unstructured data, such as log files. FM data can include, e.g., alarms events indicating a device failure or error state has occurred in the network. CM data can include, e.g., a log of configuration changes including timestamps and IDs of the network devices with before and after parameter values.

Once collected and aggregated at the data aggregator(s) 406, the network data may be transferred and stored in the database(s) 408. Batches of historical data can then be retrieved from the database(s) 408 by the AI engine 410, which processes the data to provide various CM analytics and inference capabilities. Data may also be streamed directly from the CN 402, the RAN 404, or the data aggregator(s) 406 to the AI engine 410 for real-time processing. Further details on the functions of the AI engine 410 are provided below.

The AI engine 410 performs computation on the input data and produces analytics and control information (ACI), which may then be sent to the SON controller(s) 412. It is noted that the AI engine 410, the SON controller(s) 412, or both, may be hosted at a data center or local central office near the RAN 404, or may be collocated with a BS itself. The SON controller(s) 412 use the ACI from the AI engine 410 to automatically perform actions on the network, such as updating the configuration of one or more network devices. The AI engine 410 also specifies in the ACI messages which devices or variables are of interest for the SON controller(s) 412 to monitor, so that the SON controller(s) 412 may only monitor a subset of network devices and data variables for more efficient operation. The SON controller(s) 412 may also provide feedback messages to the AI engine 410 about the state of the monitored devices and variables, so that the AI engine 410 can quickly adapt to changing network conditions and provide updated ACI to the SON controller(s) 412.

Analytics information generated by the AI engine 410 may be transmitted to the user client 414 in one or more user client information (UCI) messages for analysis by a network operations engineer or other personnel. The user client 414 can display the analytics results in a user interface, which can include data tables, plots and other visualizations of the PM/CM/FM data along with anomalies or faults that have been detected, root cause analysis (RCA) of the faults, and one or more configuration parameters that may be correlated with the results. Additionally, the user interface may accept commands from the user, which may be sent to the SON controller 412 or directly to the network device(s) to perform an action, such as a configuration update. Commands or feedback may also be sent by the user to the AI engine 410. This feedback may be used by the AI engine 410 to adjust its analysis results, for example, by retraining one or more machine learning (ML) algorithms. For example, a user may provide feedback to the AI engine 410 indicating the root cause of certain anomaly events, or an indication of whether or not the automatic RCA diagnosis from the AI engine 410 was correct.

Figure 5:
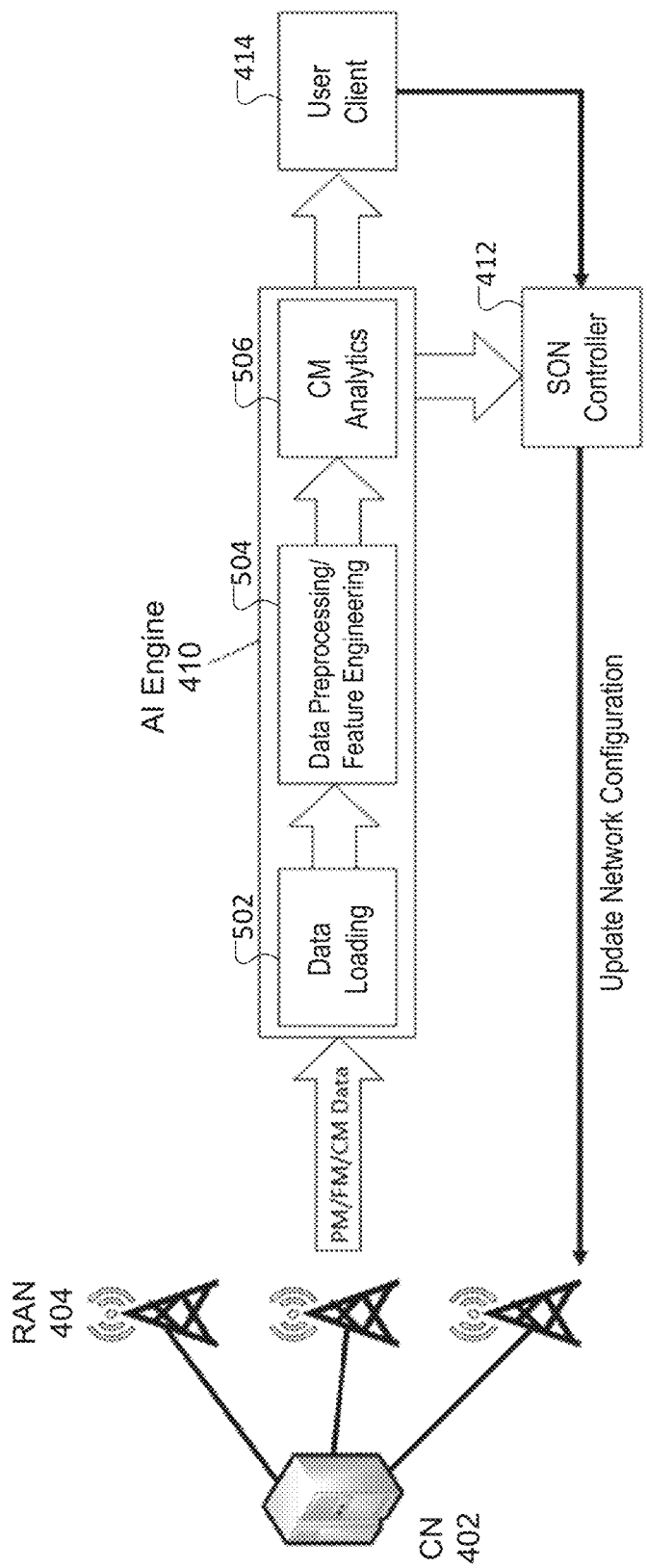
FIG. 5 illustrates further details of the AI engine of FIG. 4 according to embodiments of the present disclosure.

FIG. 5 illustrates further details of the AI engine 410 according to embodiments of the present disclosure. The embodiment of the AI engine 410 shown in FIG. 5 is for illustration only. Other embodiments of the AI engine 410 could be used without departing from the scope of this disclosure. As shown in FIG. 5, the AI engine 410 includes a data loading operation 502, a data preprocessing/feature engineering operation 504, and a CM analytics operation 506.

In the data loading operation 502, PM, FM, and/or CM data are loaded into the AI engine 410. As discussed above, batches of network data may be retrieved from the database(s) 408, or data may be streamed directly from the data aggregator(s) 406 to the AI engine 410. The system 400 supports both offline processing of batch data and real-time processing of streaming data.

The data preprocessing/feature engineering operation 504 includes operations to prepare the loaded data for use during the CM analytics operation 506. The data preprocessing/feature engineering operation 504 may include (but is not limited to) any one or more of the following: (i) removing invalid data samples, (ii) normalizing or scaling the data, (iii) removing trends and seasonality in time-series data, (iv) generating additional synthetic features from the existing KPIs and other fields in the data, (v) selecting a subset of the data samples or fields, such as a specific timeframe or a group of network devices, and (vi) merging the PM/FM and CM data into a combined data set, for example, by matching the eNB/gNB ID and cell number fields and the timestamp of entries in the PM/FM data and the CM data.

As an example, the data preprocessing/feature engineering operation 504 may include (but is not limited to) any one or more of the following steps.

(1) Data cleaning and filtering: In this step, the non-busy hour, weekend, and US holiday data are filtered out, and the data corresponding to outliers and missing values are removed. For example, in some embodiments, the busy hours can be defined as 8:00 am to 9:00 pm; weekends consist of Saturday and Sunday; US holidays can be selected by using a Python built-in function from a holidays package (e.g., holidays.US( )). Outliers can be identified by statistical outlier detection techniques or based on predetermined thresholds on KPIs. The missing values may include "NA" and "NaN" values. Of course, other data can be filtered out according to other rules, which are within the scope of this disclosure.

(2) Synthetic KPI generation: In this step, certain sets of synthetic KPIs are generated using the available KPIs. For example, the cumulative distribution of each KPI can be generated.

(3) KPI selection based on domain knowledge: Based on engineering domain knowledge, KPIs can be selected as features of the ML models (particularly the regression models) to be trained in the CM analytics operation 506. Domain-knowledge based feature selection methods are typically reliable since they depend on engineering physics but are very coarse if it is difficult to quantify the impacts of features. After this step is done, only the selected KPIs will be kept in the PM data.

(4) CM filtering (KPI selection to mitigate parameter masking effects): The purpose of this filtering step is to remove any KPIs that are highly correlated with the configuration changes of interest. Particularly, in the regression models to be trained in the CM analytics operation 506, there is a target KPI/KQI (e.g., DL throughput) as well as other selected KPIs. In the KPI selection procedure, one needs to be careful that selected KPIs do not just capture (or mask) the configuration changes. The CM filter of step (4) can be realized using any of several different techniques, one example of which is shown in FIG. 6, which illustrates a process 600 for KPI selection in CM filtering to avoid masking a configuration change.

Figure 6:
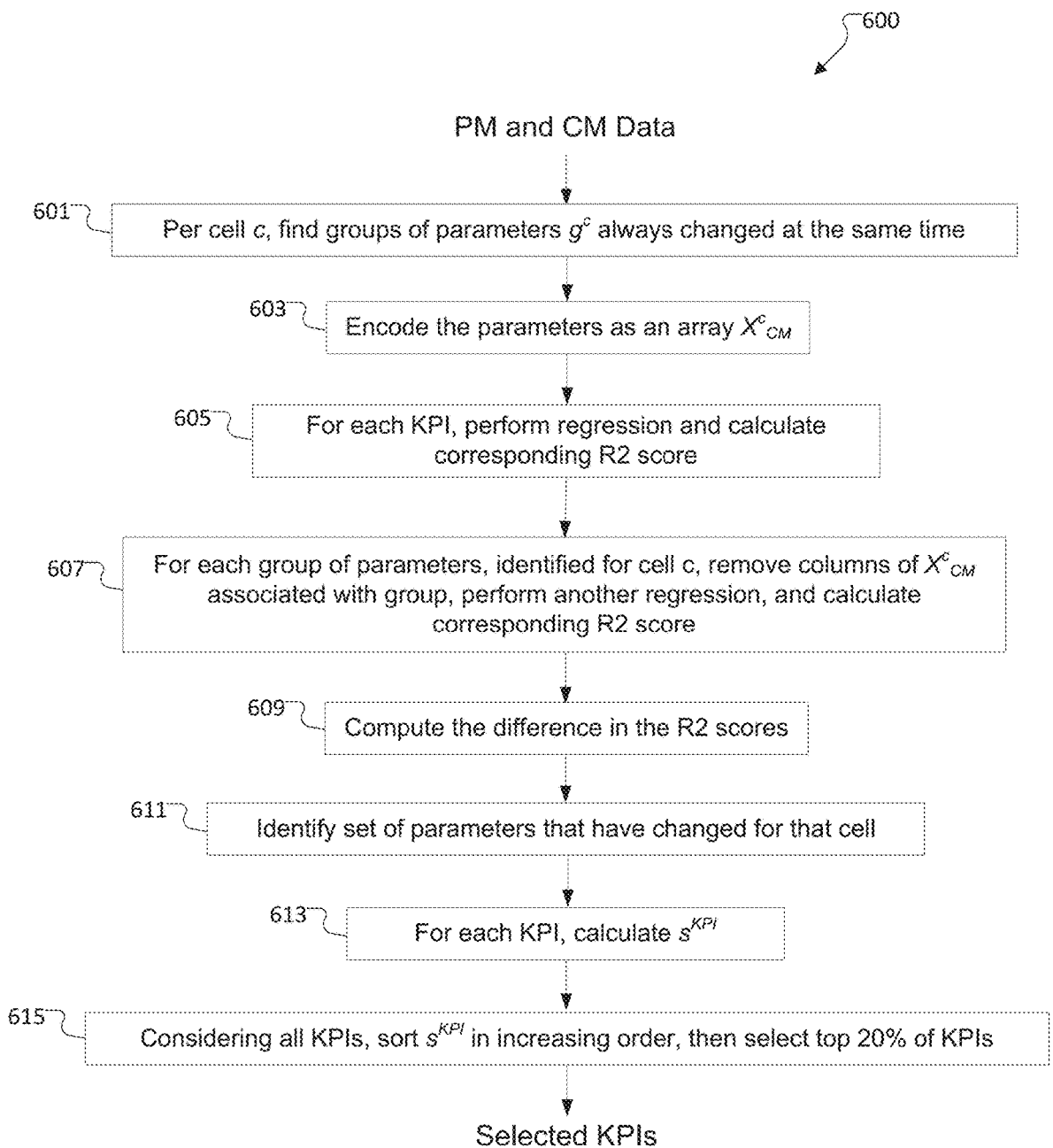
FIG. 6 illustrates a process for KPI selection in CM filtering to avoid masking a configuration change according to embodiments of the present disclosure.

As shown in FIG. 6, in the process 600, let C be the set of all cells under consideration. In step 601, per cell $c \in C$, parameters that always change at the same time for that cell are grouped together. For example, if $p_1$ and $p_2$ change at times $t_1$, $t_2$, and $t_3$, and $p_3$ changes at times $t_2$ and $t_3$, then these parameters can be grouped into two parameter groups, $g_1 = \{p_1, p_2\}$ and $g_2 = \{p_3\}$.

In step 603, the parameters are encoded as an array $X_{CM}^c$, where the rows correspond to time and the columns correspond to the encoding of the parameters that have changed value over the period of interest (discussed in detail below).

In step 605, for each KPI, a regression is performed as follows:

$$\hat{Y}^{c,kpi} = f^{c,kpi}(X_{CM}^c)$$

and a corresponding R2 score, denoted as $R2^{c,kpi}$, is calculated.

Next, in step 607, for each group of parameters $g_1^c, \ldots, g_k^c$ identified for this cell, the columns of $X_{CM}^c$ associated with group $g_i^c$ are removed, and another regression is performed as follows:

$$\hat{Y}^{c,kpi} = f_{g_i^c}^{c,kpi}(X_{CM,g_i^c}^c)$$

The corresponding R2 score, denoted as $R2_{g_i^c}^{c,kpi}$, is calculated.

In step 609, the difference in the two R2 scores is computed as follows:

$$\Delta R2_{g_i^c}^{c,kpi} = R2^{c,kpi} - R2_{g_i^c}^{c,kpi}$$

The computed difference is a rough proxy for the explanatory power of this configuration change group on the KPI.

In step 611, given $c \in C$, the set of parameters that have changed for that cell, denoted as $P^c$, are identified.

In step 613, for each KPI, a score $s^{kpi}$ is calculated as follows:

$$s^{kpi} = \max_{c \in C, P^c \cap g_i^c \neq \emptyset} \Delta R2_{g_i^c}^{c,kpi}.$$

In step 615, the $s^{kpi}$ scores are sorted in an increasing order to rank KPIs with respect to their sensitivity to the configuration changes. Then, only the least sensitive K % (e.g., 20%) of the KPIs are selected as the output of the CM filtering.

(5) Encoding configuration parameters: For configuration parameters with an associated numerical value, that value can be used to define a feature in a ML model. If no numerical value may naturally be associated with a parameter, all categorical values for that parameter that appear in the CM dataset are identified and assigned an ordinal value. For configuration changes that apply at an eNB/gNB level, the constructed feature is made available for all cells associated with that eNB/gNB. Finally, some parameters may have to be encoded as vectors at the eNB level, and so these parameters appear as vectors when applied to the associated cells.

Figure 7:
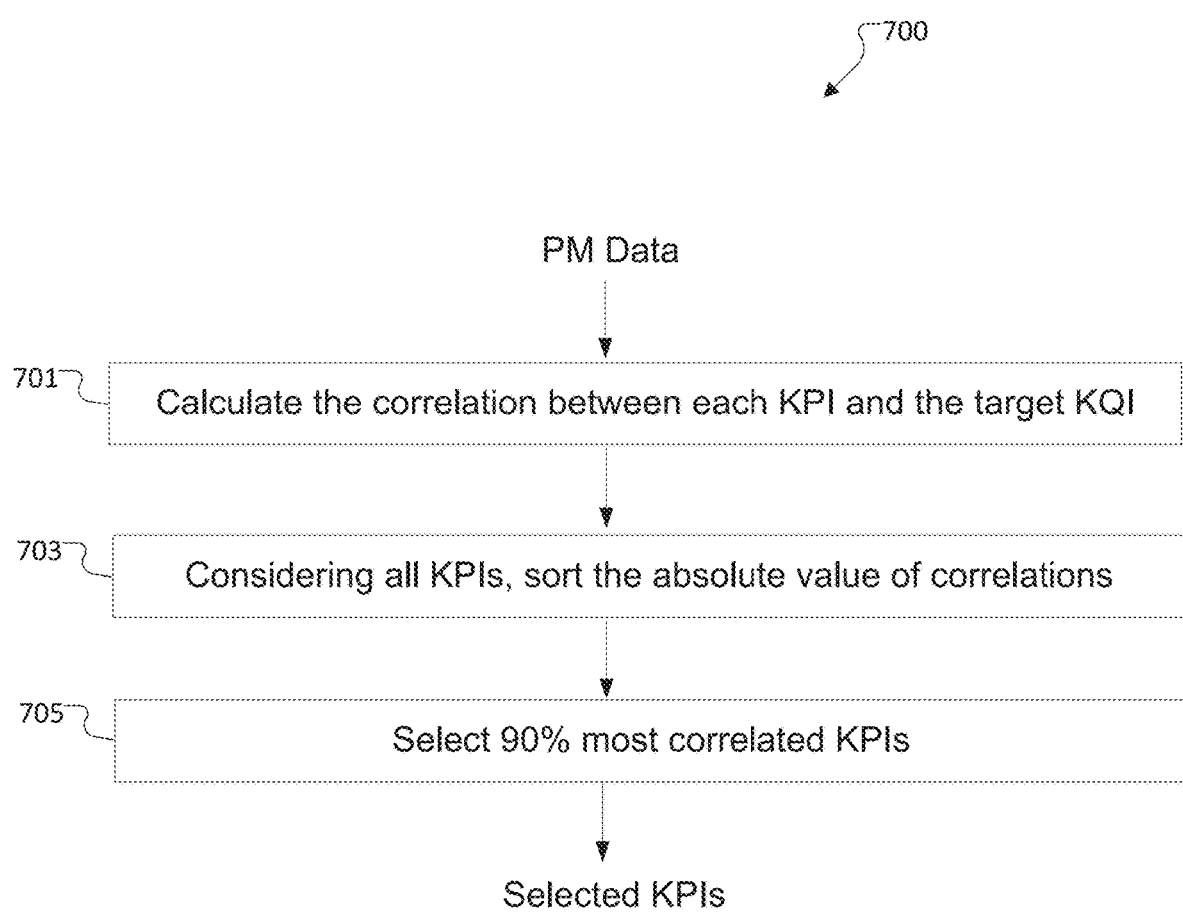
FIG. 7 illustrates a process for KPI selection in PM filleting by correlation with the target KPI according to embodiments of the present disclosure.

(6) PM filtering: This filter is specific to the target KPI or KQI of interest and is summarized in FIG. 7, which illustrates a process 700 for KPI selection in PM filtering by correlation with the target KPI. As shown in FIG. 7, in step 701, the individual correlations between the target KQI and other regressor KPIs are calculated. In step 703, all KPIs are sorted based on the absolute value of their correlations with the target KQI. In step 705, the regressor KPIs that are most correlated with the target are selected. For example, the G % (e.g., 90%) most correlated KPIs are selected. The intersection of this set of KPIs and the one resulting from the CM filter in step (4) (FIG. 6) can then be used in the regression models.

Turning again to FIG. 5, the CM analytics operation 506 analyzes the pre-processed data (provided by the operation 504) via statistical tools (including, e.g., ML and AI algorithms), provides useful analytics, and suggests one or more actions, such as recommending or updating a configuration parameter to improve performance or resolve a network fault or other abnormal event.

With the complexity of current cellular networks, whenever a configuration change is made, either by engineers or automated processes, there is a potential for errors to be introduced, which may inadvertently result in anomalies such as faults and performance loss. To ensure proper network operation, cellular operators should keep track of the configuration changes and investigate anomalies caused by the configuration changes, and take action to remedy them. Therefore, it is useful for operators to have at their disposal an automated RCA system that intelligently monitors the network state and automatically identifies anomalies caused by the configuration changes. To this end, the CM analytics operation 506 includes performing the RCA.

Figure 8:
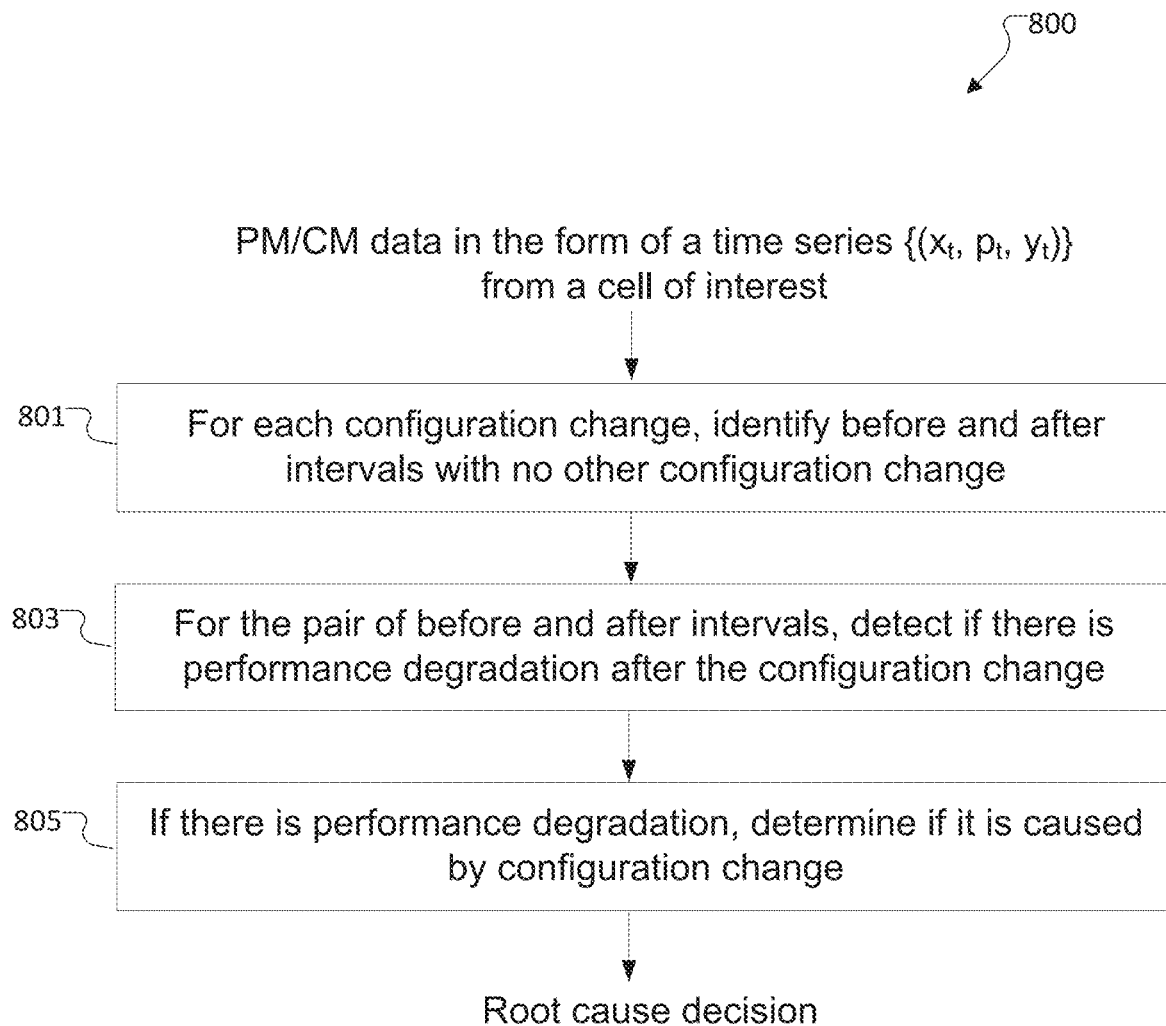
FIG. 8 illustrates a process for root cause analysis (RCA) for configuration changes at a cell of interest according to embodiments of the present disclosure.

The general workflow of the RCA for configuration changes is summarized in FIG. 8, which illustrates a process 800 for RCA for configuration changes at a cell of interest, which may be performed during the CM analytics operation 506. As shown in FIG. 8, in step 801, the PM and CM time-series data collected from a cell of interest are split into time intervals based on the configuration changes. In particular, for each configuration change, the before and after intervals are identified such that no other configuration changes happen within these intervals. In step 803, the before and after intervals are analyzed to detect if there is a performance degradation after configuration change (i.e., anomaly detection). In step 805, if there is a performance degradation, the before and after intervals are analyzed to decide if the performance degradation is caused by the configuration change. To perform the RCA, a regression-based approach can be used, as described in greater detail below. Of course, other techniques can be used for performing the RCA and are within the scope of this disclosure.

In addition to RCA, the CM analytics operation 506 also recommends values of configuration parameters to optimize the network performance. For each cell, functional cell behavior might be different because of the cell physics as well as cell surroundings (e.g., buildings near the base station). Hence, a cell-level analysis can be useful for parameter recommendation, as described with respect to FIG. 9.

Figure 9:
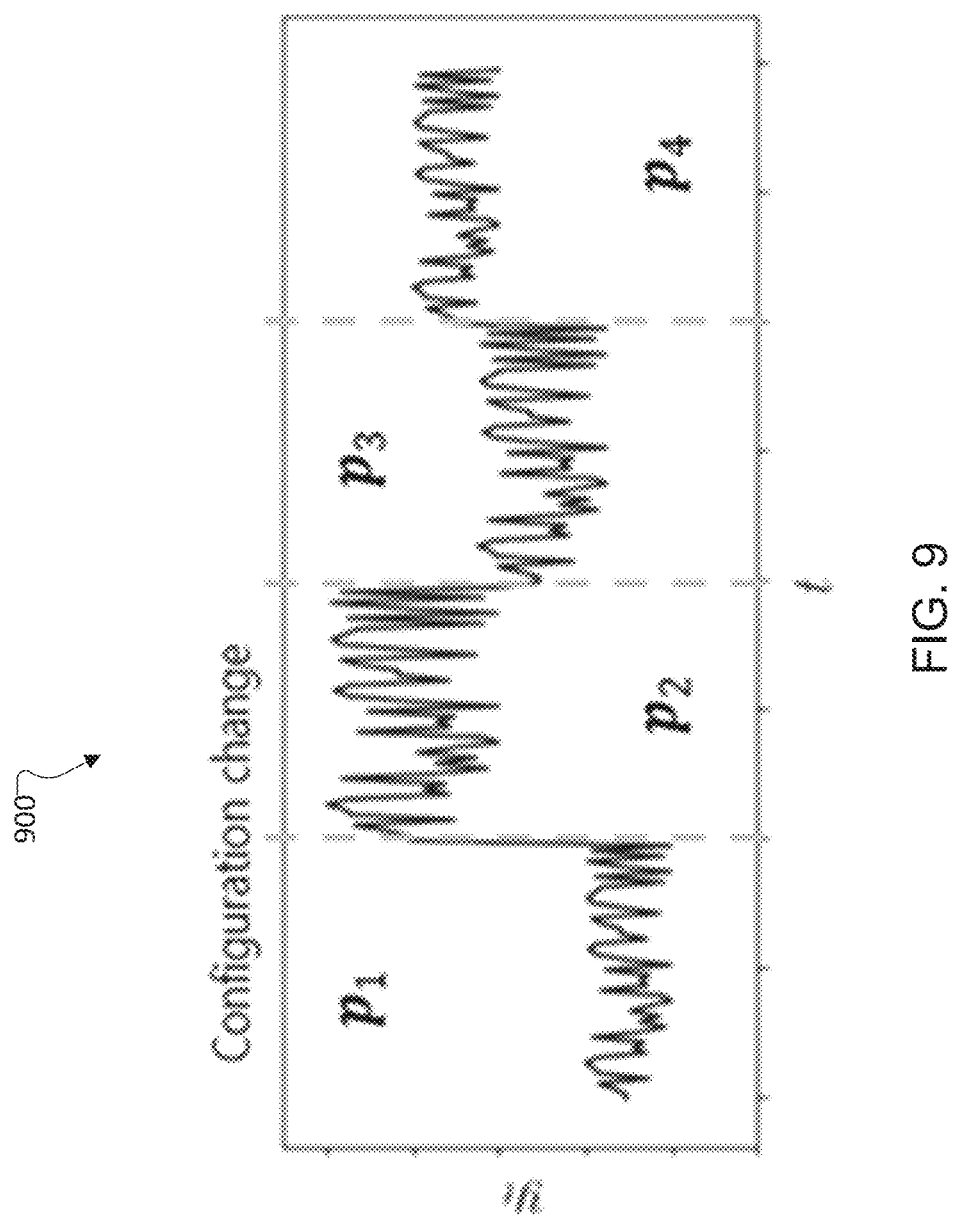
FIG. 9 illustrates a chart showing target KQI vs. time at a cell under different parameter configurations.

FIG. 9 illustrates a chart 900 showing target KQI vs. time at a cell under different parameter configurations $p_1$, $p_2$, $p_3$, and $p_4$. Assume there are L possible parameter values $p_\ell$, $\ell = 1, 2, \ldots, L$ at a cell (e.g., in FIG. 9, L=4, although other values are possible). Considering that $p_\ell$ is a parameter vector (i.e., consists of multiple parameters) and there are typically only a few possible historical parameter values for a given cell (i.e., L is small), it may not be possible to learn the functional dependency in the form of y=F(x, p) at the cell-level. This is because parameter diversity is typically insufficient to learn such a regression model. On the other hand, assuming that for each parameter setting $p_\ell$, a group of samples $S_\ell = \{(x_\ell, y_\ell)\}$ with cardinality $|S_\ell| = N_\ell$ exists, it is, in general, possible to learn a functional dependency in the form of $y=F_p(x)$ for each parameter setting $p=p_\ell$ at the cell.

Figure 10:
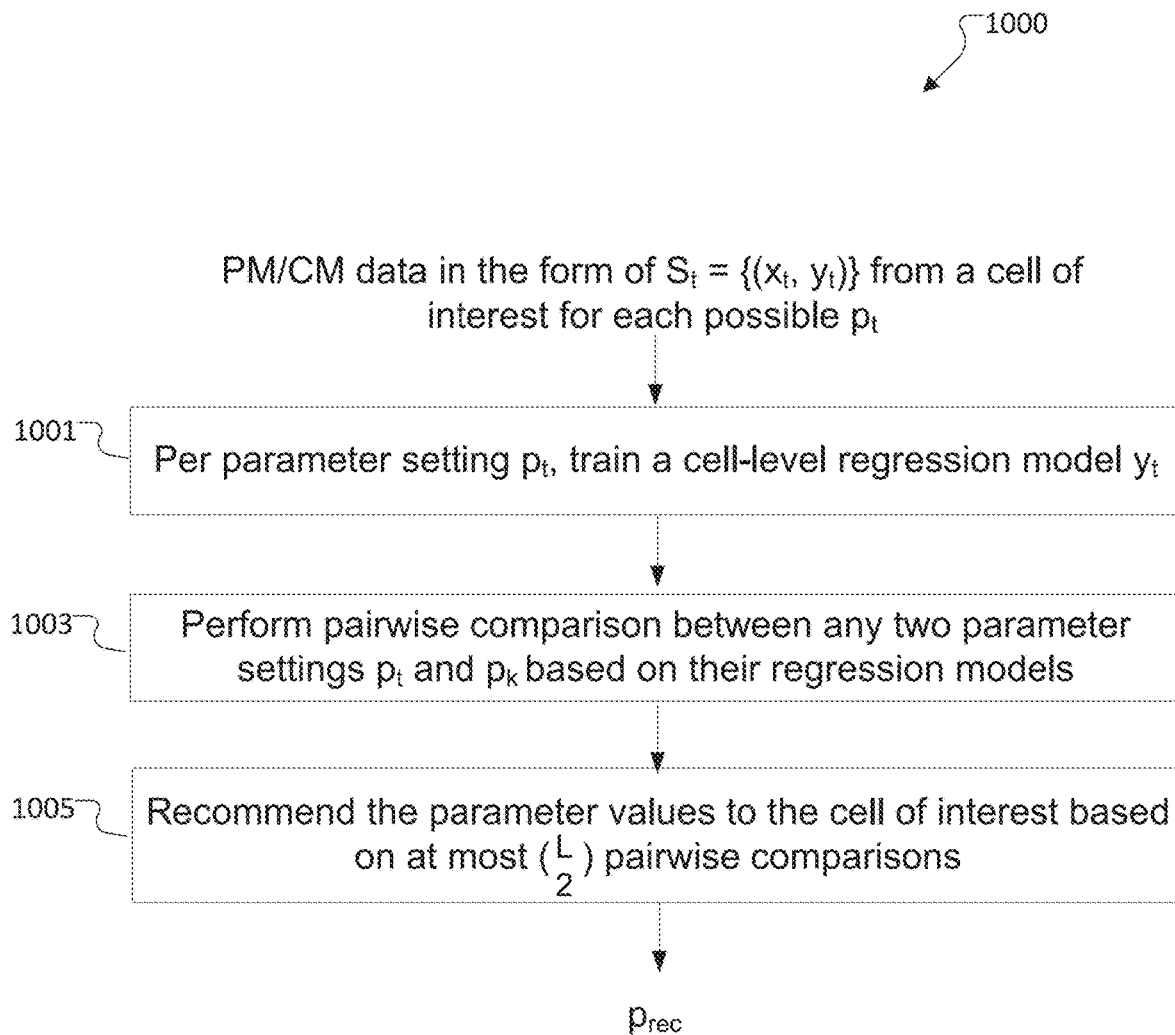
FIG. 10 illustrates an example process for cell-level analysis for parameter recommendation, according to embodiments of the present disclosure.

FIG. 10 illustrates an example process 1000 for the cell-level analysis for parameter recommendation, according to embodiments of the present disclosure. One objective of the process 1000 (which may be performed during the CM analytics operation 506) is to infer the best static (i.e., long-term) parameter configuration at a given cell with the available data. As shown in FIG. 10, in step 1001, per parameter setting, a cell-level regression model $y=F_p(x)+\epsilon$ is calibrated. Based on the regression models for all possible parameter settings, in step 1003, a pairwise comparison of parameter settings $p_\ell$ and $p_k$ is performed to test if there is a statistically significant improvement or degradation in the mean target KQI and if this is because of the parameter configuration. In step 1005, with at most $$\binom{L}{2}$$

pairwise comparisons, the best static parameter configuration at a given cell can be determined and recommended. The steps 1001 and 1003 are explained in further detail below, along with example solutions ((i) one-group regression with parametric test and (ii) two-group regression with parametric test) for the pairwise parameter comparison between any two parameter settings $p_\ell$ and $p_k$.

One-Group Regression with Parametric Test

In some embodiments, a one-group regression approach with parametric mean test can be used for the parameter recommendation as well as the RCA for configuration changes. As an example, the procedure for parameter recommendation will now be explained.

Under the parameter setting $p_\ell$, let the unknown ground truth function be $y=F_{p_\ell}(x)$. Similarly, under the parameter setting $p_k$, let the unknown ground truth function be $y=F_{p_k}(x)$. For ease of explanation, assume $F_{p_k}(x) \geq F_{p_\ell}(x)$, $x \in \text{dom}(F_{p_\ell}) \cap \text{dom}(F_{p_k})$ (i.e., the parameter setting $p_k$ is better than $p_\ell$). Here, dom(•) denotes the domain of a function, which means the set into which all inputs of the function is constrained to fall. In the one-group regression approach, the following procedure can be used for a comparison between $p_\ell$ and $p_k$, regardless of the former assumption, Step 1: Partition the group $\ell$ samples $S_\ell = \{(x_\ell, y_\ell)\}$ into training and test sets, $S_\ell^{train} = \{(x_\ell^{train}, y_\ell^{train})\}$ with $|S_\ell^{train}| = N_\ell^{train}$ and $S_\ell^{test} = \{(x_\ell^{test}, y_\ell^{test})\}$ with $|S_\ell^{test}| = N_\ell^{test}$, respectively, where $N_\ell^{train} + N_\ell^{test} = N_\ell$.

Step 2: Calibrate a regression model $\hat{F}_{p_\ell}(\cdot)$ using training samples from the group $\ell$ only: $y_\ell^{train} = \hat{F}_{p_\ell}(x_\ell^{train}) + \epsilon_\ell$, where $\epsilon_\ell$ denotes the residual term.

Step 3: Compute the residuals on the two groups separately:

$$\epsilon_\ell = y_\ell^{test} - \hat{F}_{p_\ell}(x_\ell^{test}),$$

$$\epsilon_k = y_k - \hat{F}_{p_\ell}(x_k).$$

At this point, it is noted that $\hat{F}_{p_\ell}(x) \approx \hat{F}_{p_\ell}(x)$ and because of the assumption $F_{p_k}(x) \geq \hat{F}_{p_\ell}(x)$ in the beginning, it is expected that $F_{p_k}(x) \geq \hat{F}_{p_\ell}(x)$. Hence, while $\epsilon_\ell$ is expected to be zero-mean, $\epsilon_k$ is expected to take positive values on the average. Hence, the parameter settings $p_\ell$ and $p_k$ can be compared based on their residual means.

Step 4: Perform the mean test on the set of residuals $\{\epsilon_\ell\}$ and $\{\epsilon_k\}$ computed in the previous step:

$$H_0: \bar{\epsilon}_\ell = \bar{\epsilon}_k,$$

$$H_1: \bar{\epsilon}_k > \bar{\epsilon}_\ell$$

where $H_0$ and $H_1$ denote the null and alternative hypotheses, respectively. If $H_0$ is rejected at a chosen significance level $\alpha$, decide that $p_k$ is better than $p_\ell$ and finish the procedure. If not, go to the next step.

Step 5: Perform the mean test on the set of residuals:

$$H_0: \bar{\epsilon}_\ell = \bar{\epsilon}_k,$$

$$H_1: \bar{\epsilon}_\ell > \bar{\epsilon}_k.$$

If $H_0$ is rejected at a chosen significance level $\alpha$, decide that $p_\ell$ is better than $p_k$ and finish the procedure. If not, go to the next step.

Step 6: Decide that there is no statistically significant difference between $p_\ell$ and $p_k$, and finish the procedure.

The mean tests in Steps 4 and 5 above can be performed using a parametric mean test, for example, the Welch's t-test. By construction, the Welch's t-test assumes independent and identically distributed Gaussian residuals for both groups, but the test is still valid with non-normal residuals for sufficiently large sample sizes (roughly $N_\ell$, $N_k \geq 50$ should be fine).

Note that in the one-group regression approach, only $x_\ell$ samples are used while training the regression model and thus $x_k$ samples are never seen by $\hat{F}_{p_\ell}(\cdot)$ during training. However, to compute the residuals $\epsilon_k$ for the group k in Step 3 above, it may be necessary to compute $\hat{F}_{p_\ell}(x_k)$ and for a reliable computation with $\hat{F}_{p_\ell}(x_k)$, $x_\ell$ and $x_k$ should have similar statistics. As the discrepancy (e.g., the KL divergence) between the (unknown) distributions of $x_\ell$ and $x_k$ increases, performance of the one-group regression approach is expected to degrade. This motivates an alternative solution based on the two-group regression, as explained next.

Two-Group Regression with Parametric Test

In some embodiments, a two-group regression approach with parametric mean test can be used for the parameter recommendation as well as the RCA for configuration changes. As an example, the procedure for parameter recommendation will now be explained.

Suppose that under the parameter setting $p_\ell$, the unknown ground truth function is $y = F_{p_\ell}(x)$. Similarly, under the parameter setting $p_k$, suppose the unknown ground truth function is $y = F_{p_k}(x)$. For ease of explanation, assume $F_{p_k}(x) \geq$ $F_{p_\ell}(x)$, $x \in \text{dom}(F_{p_\ell}) \cap \text{dom}(F_{p_k})$. In the two-group regression approach, the following procedure can be used (regardless of the former assumption).

Step 1: Partition group $\ell$ samples $S_\ell = \{(x_\ell, y_\ell)\}$ into training and test sets, $S_\ell^{train} = \{(x_\ell^{train}, y_\ell^{train})\}$ with $|S_\ell^{train}| = N_\ell^{train}$ and $S_\ell^{test} = \{(x_\ell^{test}, y_\ell^{test})\}$ with $|S_\ell^{test}| = N_\ell^{test}$, respectively, where $N_\ell^{train} + N_\ell^{test} = N_\ell$. Similarly, partition group k samples $S_k = \{(x_k, y_k)\}$ into training and test sets, $S_k^{train} = \{(x_k^{train}, y_k^{train})\}$ with $|S_k^{train}| = N_k^{train}$ and $S_k^{test} = \{(x_k^{test}, y_k^{test})\}$ with $|S_k^{test}| = N_k^{test}$, respectively, where $N_k^{train} + N_k^{test} = N_k$.

Step 2: Generate a training dataset by pooling samples from both groups:

$$x^{train} = x_\ell^{train} \cup x_k^{train},$$

$$y^{train} = y_\ell^{train} \cup y_k^{train}.$$

Step 3: Calibrate a regression model $\hat{F}(\cdot)$ such that $y^{train} = \hat{F}(x^{train}) + \epsilon$, where $\epsilon$ is the residual term. In the regression training, use sample weighting in favor of the smaller-size group if there is a sample size imbalance between two groups (i.e., if $N_\ell^{train} \gg N_k^{train}$ or $N_k^{train} \gg N_\ell^{train}$).

Step 4: Compute the residuals on the test sets of two groups separately:

$$\epsilon_\ell = y_\ell^{test} - \hat{F}(x_\ell^{test}),$$

$$\epsilon_k = y_k^{test} - \hat{F}(x_k^{test}).$$

At this point, it is noted that because of the assumption $F_{p_k}(x) \geq F_{p_\ell}(x)$ in the beginning and since $\hat{F}(\cdot)$ is calibrated with samples from both groups, it is expected that $F_{p_k}(x) \geq \hat{F}(x) \geq F_{p_\ell}(x)$. That is, the regression model does smoothing between the ground truth functions of the two groups. Hence, while $\epsilon_\ell$ is expected to take negative values on the average, $\epsilon_k$ is expected to take positive values on the average. The parameter settings $p_\ell$ and $p_k$ can then be compared based on their residual means.

Step 5: Perform the mean test on the set of residuals $\{\epsilon_\ell\}$ and $\{\epsilon_k\}$ computed in Step 4:

$$H_0: \bar{\epsilon}_\ell = \bar{\epsilon}_k,$$

$$H_1: \bar{\epsilon}_k \geq \bar{\epsilon}_\ell,$$

If $H_0$ is rejected at a chosen significance level $\alpha$, decide that $p_k$ is better than $p_\ell$ and finish the procedure. If not, go to the next step.

Step 6: Perform the mean test on the set of residuals:

$$H_0: \bar{\epsilon}_\ell = \bar{\epsilon}_k,$$

$$H_1: \bar{\epsilon}_\ell > \bar{\epsilon}_k.$$

If $H_0$ is rejected at a chosen significance level $\alpha$, decide that $p_\ell$ is better than $p_k$ and finish the procedure. If not, go to the next step.

Step 7: Decide that there is no statistically significant difference between $p_\ell$ and $p_k$, and finish the procedure.

The mean tests in Steps 5 and 6 above can be performed using a parametric mean test, for example the Welch's t-test. It is noted that the two-group regression approach does not require the same domain or the same distribution for the regressors $x_\ell$ and $x_k$ of the two groups. Although discrepancy between the distributions of $x_\ell$ and $x_k$ may still degrade its performance, the two-group regression approach is more robust to this discrepancy compared to the one-group regression approach.

M-Fold Regression

In some embodiments, a M-fold regression technique can be used during the CM analytics operation 506 as a regression enhancement technique. To improve both sample efficiency and model stability (despite more computations), M>1 different regression models can be trained with the available data and all M models can be incorporated into the decision process for pairwise parameter comparison. The procedure is explained as follows.

Step 1: Partition the available data into equally-sized M parts.

Step 2: Use M−1 parts of data to train a regression model.

Step 3: Use the remaining one part to compute a subset of residuals.

Step 4: Repeat Steps 2 and 3 M times, where at each repetition, use a different dataset for training the regression model (and for computing the residuals).

Step 5: Generate the final set of residuals by pooling together the M subsets of residuals (where each subset is computed at Step 3). The final set of residuals will be used in the mean tests for parameter comparison.

This M-fold regression enhancement technique can be applied to both the one-group regression and the two-group regression approaches discussed above. In the M-fold one-group regression, referring to the one-group regression approach described before, $S_\ell$ is partitioned into M parts in Step 1 above and the regression is trained using the M−1 parts of $S_\ell$. Next, the remaining one part of $S_\ell$ is used to compute the residual for the group $\ell$ in Step 3. Moreover, residuals for the group k are computed using the regression model calibrated at Step 2. This is repeated M times as stated in Step 4. Finally, in Step 5, the final set of residuals for each group are obtained separately by pooling together the subsets of residuals previously computed at Step 3.

In the M-fold two-group regression, referring to the two-group regression approach described before, both $S_\ell$ and $S_k$ are partitioned into M parts in Step 1 above. Next, in Step 2, M−1 parts of $S_\ell$ and M−1 parts of $S_k$ are pooled together to train a common regression model. Next, in Step 3, residuals for each group are computed separately using the remaining one part of each group. This is repeated M times as stated in Step 4. Finally, in Step 5, the final set of residuals for each group are obtained separately by pooling together their subsets of residuals previously computed at Step 3.

An ensemble of ML models can perform better than a single ML model (see, e.g., the random forest learning as an ensemble of decision trees). The M-fold regression depends on an ensemble of regression models and hence improves the model stability. Furthermore, the M-fold regression improves sample efficiency since (i) more samples are used in the training of each regression model, particularly (M−1)/M ratio of available samples is used in each regression, and (ii) the size of the final residual sets is larger for both groups. The sample efficiency is especially critical for small sample sizes, typically observed at field tests for continuous improvement trials and closed-loop parameter optimizations in the cellular networks. With more residual samples obtained based on multiple regression models, the mean tests for parameter comparison can output more reliable decisions (i.e., a higher probability of correct decision).

Validation

The parameter recommendation solutions described above can be validated using artificial data. The objective of using artificial data is to generate test cases where the ground truth comparison between any two parameters is known and evaluate the performance of the parameter recommendation solutions accordingly. In some embodiments, the following linear model can be used to generate the artificial data:

$$y = w(p)^T x(h) + n,$$

where y denotes the target KQI, x denotes the regressor KPIs, p denotes the parameter value, h denotes a hidden variable to account for unobservable factors, and n denotes the zero-mean Gaussian noise. The coefficient vector w can be determined based on the parameter value p (it is assumed that p is scalar for convenience). Moreover, the distribution of regressors x depends on the hidden variable h, controlled via the sample size. For this model, the signal-to-noise ratio (SNR) is given by $$SNR = \frac{E\left[(w(p)^T x(h))^2\right]}{E[n^2]}.$$

Assuming Gaussian regressor KPIs and for each group i, $x_i \sim N(\mu_{x,i}, \sigma_{x,i}^2 I)$. It is assumed that in the long-term, random and seasonal effects (representing hidden variables) will be similar under different parameter settings. To capture the long-term and short-term effects, the variance $\sigma_{x,i}^2$ of each regressor in the group $S_i$ is assigned inversely proportional to the sample size as given by:

$$\sigma_{x,i}^2 = \frac{\sigma^2}{cN_i},$$

where $\sigma^2$ is a chosen base value for the regressor variance and c is a variable to adjust the proportionality. For two groups $S_i$ and $S_j$, divergence of regressor distributions increases with sample size imbalance, which can be represented by $$\max\left\{\frac{N_i}{N_j}, \frac{N_j}{N_i}\right\}.$$

Let $w(p) = [w_{p,1}, w_{p,2}, \ldots, w_{p,B}]$ for a given parameter value p. If $p_j$ is better (larger) than $p_i$, then it is assumed that $w_{p_j,b} \geq w_{p_i,b}, \forall b \in \{1,2,\ldots,B\}$ and there exists at least one $b \in \{1,2,\ldots,B\}$ such that $w_{p_j,b} > w_{p_i,b}$. In some embodiments, the following steps can be used to generate the coefficient vectors $w(p_i)$ and $w(p_j)$ for the two groups based on their parameter values:

(i) A random coefficient vector $w(p_i)$ is generated for the first group, (ii) If $p_j = p_i$, set $w(p_j) = w(p_i)$, (iii) If $p_j \neq p_i$, a random index subset I is chosen from $\{1,2,\ldots,B\}$, (iv) For all $b \notin I$, set $w_{p_j,b} = w_{p_i,b}$, (v) For all $b \in I$, set $w_{p_j,b} = w_{p_i,b} + (p_j - p_i) U[0,1]$ where $U[0,1]$ is a uniform random variable. That is, $w(p_j) - w(p_i)$ is proportional to $p_j - p_i$.

In some embodiments, it is assumed that there is a default parameter setting $p_0$. Performance of conventional techniques and the regression-based solutions disclosed herein can be evaluated against the default setting. Evaluation is based on the long-term average target KPI (assuming that random and seasonal effects are similar in the long-term under different parameter settings). In one type of evaluation, let $p_*$ denotes the best parameter setting among the possible settings (including the default setting).

Let the long-term average target KPI under the best parameter setting and the default one be denoted with $\bar{y}_*$ and $\bar{y}_0$, respectively. The maximum possible gain that a parameter setting can achieve over the default setting is then given by the following:

$$\text{Max Gain \%} = \frac{\bar{y}_* - \bar{y}_0}{\bar{y}_0} \times 100$$

If a method recommends the parameter setting $p_i$ with the corresponding long-term average target KPI $\bar{y}_i$, the gain of this method is then given by:

$$\text{Gain \%} = \frac{\bar{y}_i - \bar{y}_0}{\bar{y}_0} \times 100$$

In some experiments, the performance of conventional solutions is compared with the disclosed regression-based solutions at various SNRs (e.g., −5 dB, 0 dB, 5 dB, and 10 dB). These experiments show that performance of the regression-based solutions improves with the SNR and the sample size. Even at low SNRs, the ten-fold two-group regression solution disclosed herein always outperforms the conventional solutions. For larger SNRs, the regression-based solutions always outperform the conventional solutions.

One-Group Regression with Nonparametric Test

In some embodiments, a one-group regression approach with nonparametric test can be used for the parameter recommendation as well as RCA for configuration changes. As an example, the RCA procedure described below can be used. The procedure is based on determining a change in the conditional distribution of the target KQI of interest with respect to selected KPIs. KPI selection can be based on both engineering domain knowledge and automated procedures (e.g., see the CM filtering and the PM filtering in the data preprocessing/feature engineering operation 504 above).

(1) Anomaly definition: It is considered that an anomaly has happened after a configuration change if the performance of a target KQI is significantly lower than what would have been expected if no change had been made. Mathematically, this can be stated as the following:

$$\text{Prob}_b(S(Y_b, X_b) \leq S(Y_a, X_a)) \leq \delta$$

where $S(\cdot)$ is a summary statistic, $Y_b$ and $Y_a$ are the target KQI before and after the change respectively, $X_b$ and $X_a$ are the regressor KPIs before and after the change respectively, and $\text{Prob}_b$ is a probability model based on the pre-change world.

(2) Probability model: It is assumed that the target KQIs $Y^t$ depend on observable KPIs $X^t$, managed parameters $p$, and unobservable parameters $Z^t$ through a relation, which may be expressed as:

$$Y^t = F(X^t, p, Z^t) = F_p(X^t, Z^t).$$

The placement of $p$ as a subscript is meant to indicate that these parameters do not change frequently and one can think of separate functional dependencies before and after a change event. Using subscripts $b$ to denote "before" values and subscripts $a$ for "after" values, the following expressed are given:

$$Y_b^t = F_{p_b}(X_b^t, Z_b^t),$$

$$Y_a^{t'} = F_{p_a}(X_a^{t'}, Z_a^{t'}).$$

One goal is to detect whether a configuration change has caused deterioration in the target KQI that cannot be explained by other regressors. To this end, assume that the above functional dependencies can be modeled as:

$$Y_b^t = \hat{F}_{p_b}(X_b^t) + \epsilon_b^t,$$

$$Y_a^{t'} = \hat{F}_{p_a}(X_a^{t'}) + \epsilon_a^{t'},$$

where $\hat{F}(\cdot)$ is a regression model that captures the dependency of $Y_{:\square}^t$ ($Y_{:\square}^{t'}$) on $X_{:\square}^t$ ($X_{:\square}^{t'}$).

(3) Degradation Identification Procedure: The summary statistic can be expressed as:

$$S(Y, X) = \frac{1}{K}\sum_{i=1}^{K}\left(Y^i - \hat{F}_{p_b}(X^i)\right),$$

Figure 11:
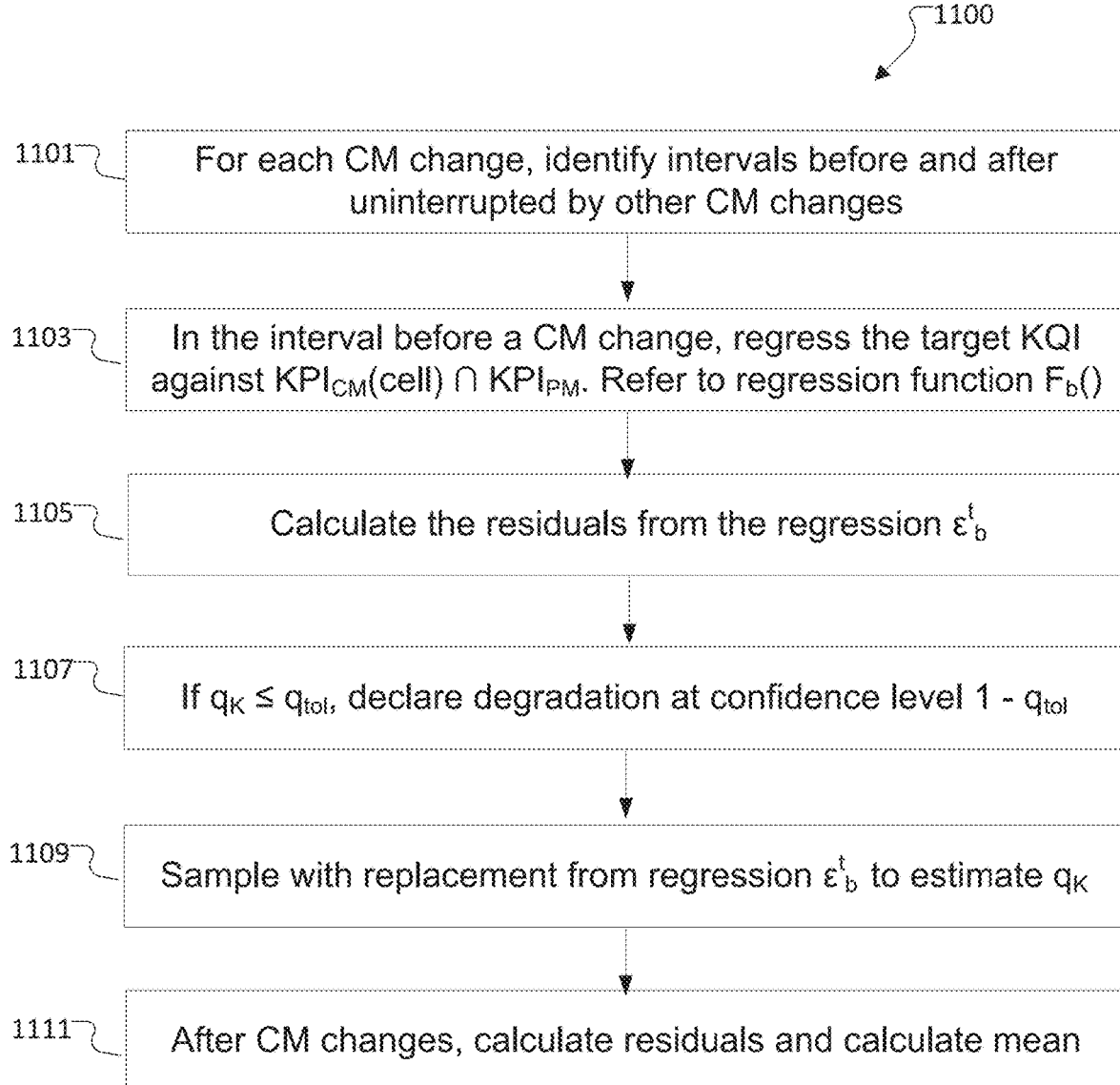
FIG. 11 illustrates a process for RCA for degradation events based on a regression approach, according to embodiments of the present disclosure.

The general workflow of the degradation identification procedure is summarized in FIG. 11, which illustrates a process 1100 for root cause analysis for degradation events based on the regression approach, which may be performed during the CM analytics operation 506. As shown in FIG. 11, in step 1101, for a configuration change, identify the before and after intervals, which do not include any other change.

At step 1103, employ the CM filtering and the PM filtering (see the operation 504) to determine the regressor KPIs and calibrate a regression model to the before data:

$$Y_b^t = \hat{F}_{p_b}(X_b^t) + \epsilon_b^t.$$

At step 1105, calculate the residuals for the before data:

$$\epsilon_b^t = Y_b^t - \hat{F}_{p_b}(X_b^t).$$

At step 1107, given samples $\{Y_a^{t^i}, X_a^{t^i}\}_{i=1}^K$ after the configuration change, calculate the following summary statistic:

$$\mu_a^K = \frac{1}{K}\sum_{i=1}^{K}\left(Y_a^{t_i} - \hat{F}_{p_b}\left(X_a^{t_i}\right)\right).$$

At step 1109, given a large N, for $j=1:N$, calculate $$\mu_b^{K,j} = \frac{1}{K}\sum_{i=1}^{K}\epsilon_b^{t_{i,j}},$$

where the $\epsilon_b^{t^{i,j}}$ are randomly sampled with replacements from the residuals to determine the distribution of the K-mean residuals implied by the before data (i.e., a nonparametric distribution estimation). Then, compute $$q_K = \frac{\sum_{j=1}^{N} I(\mu_b^{K,j}, \mu_a^K)}{N},$$

where $$I(x, y) = \begin{cases} 1, & \text{if } x \leq y, \\ 0, & \text{otherwise.} \end{cases}$$

Here, $q_K$ is the probability implied from the residual terms of the "before" model that the average would be less than or equal to what has been observed.

At step 1111, if $q_K < q_{tol}$, declare that the configuration change has deteriorated performance at confidence level $1-q_{tol}$. Since this test is based on a nonparametric distribution estimation, it is called a nonparametric test.

(4) Validation: In some embodiments, a large number of cells (e.g., 1967 cells) can be considered for validation of this procedure. Here, the term cell refers to a configuration change corresponding to a particular eNB and cell site for which there are at least 300 samples before and after the change event and no other configuration changes are made in any of these intervals. To reduce notation, cell indices are omitted in the discussion below. The context should make clear whether a calculation is per cell or aggregated across cells.

False Detection of Degradation and Improvement:

Per cell, each sample in the before data set is randomly assigned a label from the set {1,2,3,4,5}. The procedure then iterates through the labels, considering samples labeled with the current iteration as the test set, and the remaining samples as the training set. In the application of this model, the training data plays the role of data before the configuration change, and the test data plays the role of the "after" data. Specifying the degradation identification procedure to the current setting, let $Y_{test}^{t'}, X_{test}^{t'}$ denote data assigned to the test set and let $Y_{training}^{t}, X_{training}^{t}$ denote data assigned to the training set.

First, a regression model is fit to the data in the training set:

$$Y_{training}^{t} = \hat{F}_{training}(X_{training}^{t}) + \epsilon_{training}^{t}$$

and the residuals of this model applied to the test set are calculated:

$$\epsilon_{test}^{t'} = Y_{test}^{t'} - \hat{F}_{training}(X_{test}^{t'})$$

Assuming that there are K samples in the test set, the summary statistic is calculated as:

$$\mu_{test} = \frac{1}{K} \sum_{t'=1}^{K} \epsilon_{test}^{t'}$$

Also, the empirical probability is calculated, based on residuals from the training data, whether this average would be in the left tail of the distribution based on K averages of the training residuals, $\epsilon_{training}$. Denoting the percentile corresponding to the jth test set from the cross validation as $p_{test}^{j}$, this is repeated for the five test samples, and the median $p_{test}^{med}$ is taken as the cross-validation percentile. Next, for a given confidence level $\tau$, it is determined that there has been a degradation at this confidence level if the percentile $p_{test}^{med}$ is below $1-\tau$. As the training and test data are drawn from an interval with no configuration change, it is expected that $p_{test}^{med}$ should not fall in the left tail of this empirical distribution. This is supported by the results reported in Table 1, where the probability refers to the frequency of cells where the event occurred.

TABLE 1

Probability of False Detection of Degradation at Various Confidence Levels

| Confidence | Degradation Probability |
|---|---|
| 0.9 | 0.007 |
| 0.95 | 0.002 |
| 0.99 | 0.0 |

Although the main objective is explaining degradation, the process can symmetrically consider detecting improvement. In this case, improvement can be detected at confidence level $\tau$ if the percentile $p_{test}^{med}$ is above $\tau$. The results reported in Table 2 demonstrate that no distributional change should be detected in the set used for cross validation.

TABLE 2

Probability of False Detection of Improvement at Various Confidence Levels

| Confidence | Improvement Probability |
|---|---|
| 0.9 | 0.005 |
| 0.95 | 0.0 |
| 0.99 | 0.0 |

Precision and Recall:

Here, data is considered that crosses a configuration change and so splits into the before and after data. The entire before data is used to determine the regression function $\hat{F}_{pb}$. A complication that arises in this case is that the ground truth is unavailable, whether there has been degradation or improvement for the target KQI. To this end, all of the available samples in the after data can be used to calculate the following:

$$\mu_{gt} = \frac{1}{M} \sum_{t'=1}^{M} \epsilon_{after}^{t'}$$

where M is the number of data points after the configuration change. Letting Pr(•) denote the empirical cumulative distribution function based on data from before the configuration change, it is then considered that degradation D has occurred at confidence level $\tau$ if $\Pr(\mu_{gt}) \leq 1-\tau$ and improvement I at that confidence level if $\Pr(\mu_{gt}) \geq \tau$.

Next, the prediction for degradation or improvement is considered. In the spirit of the cross validation, it is possible to sample from the after data multiple times and take a median. Here, the maximum number of points in a sample is restricted to $$\frac{M}{2},$$

since is it not desirable to match the assumed ground truth just because the same data is sampled that is used for its calculation. Five times, $$\frac{M}{2}$$

points are drawn from the after data and randomly permuted. The following is then calculated:

$$p_j^d = \Pr\left(\frac{1}{d} \sum_{t''=2}^{d} \epsilon_{after}^{t''}\right), j = 1, \ldots, 5, d = 60, 120, \ldots, \min\left(\frac{M}{2}, 300\right),$$

where j indexes the sample of $$\frac{M}{2}$$

points taken from the after data, and d is the number of these points used for prediction. It is noted that the points are indexed by t", since the sample taken from the after data is permutated. Using the following:

$$p^d = \text{median}_j \{p_j^d\},$$

the degradation prediction events are defined as:

$$E_d = p^d \leq 1 - \tau, d = 60, 120, \ldots, \min\left(\frac{M}{2}, 300\right)$$

and the improvement events are defined as:

$$E_i = p^d \geq \tau, d = 60, 120, \ldots, \min\left(\frac{M}{2}, 300\right).$$

These events are per cell, and their probabilities can be determined by aggregating results across cells. In particular, the following can be defined: Precision and recall for degradation by precision$_d$=Prob(D|E$_d$) and Recall$_d$=Prob(E$_d$|D); precision and recall for improvement by Precision$_i$=Prob(I|E$_i$) and Recall$_i$=Prob(E$_i$|I), respectively. Some test results are summarized in Tables 3, 4, 5, and 6.

TABLE 3

Precision In Case of Degradation

| confidence | days | | | | |
|---|---|---|---|---|---|
| | 1 | 2 | 3 | 4 | 5 |
| 0.9 | 0.991 | 0.99 | 0.988 | 0.992 | 0.986 |
| 0.95 | 0.99 | 0.991 | 0.995 | 0.994 | 0.99 |
| 0.99 | 0.992 | 0.998 | 1.0 | 1.0 | 1.0 |

TABLE 4

Recall In Case of Degradation

| confidence | days | | | | |
|---|---|---|---|---|---|
| | 1 | 2 | 3 | 4 | 5 |
| 0.9 | 0.75 | 0.829 | 0.877 | 0.84 | 0.835 |
| 0.95 | 0.701 | 0.795 | 0.831 | 0.813 | 0.809 |
| 0.99 | 0.651 | 0.755 | 0.811 | 0.789 | 0.785 |

TABLE 5

Precision In Case of Improvement

| confidence | days | | | | |
|---|---|---|---|---|---|
| | 1 | 2 | 3 | 4 | 5 |
| 0.9 | 0.975 | 0.987 | 0.99 | 0.981 | 0.993 |
| 0.95 | 0.984 | 0.996 | 0.998 | 0.992 | 0.984 |
| 0.99 | 0.996 | 1.0 | 0.997 | 0.997 | 0.995 |

TABLE 6

Recall In Case of Improvement

| confidence | days | | | | |
|---|---|---|---|---|---|
| | 1 | 2 | 3 | 4 | 5 |
| 0.9 | 0.604 | 0.757 | 0.832 | 0.858 | 0.863 |
| 0.95 | 0.544 | 0.712 | 0.812 | 0.839 | 0.842 |
| 0.99 | 0.413 | 0.603 | 0.704 | 0.763 | 0.773 |

In both continuous improvement trial and closed-loop parameter optimization, tuning parameters should be determined before the field tests. If the functional relationship between a target KQI of interest and the configuration parameters can be predicted well, the system 400 can identify opportunities for performance improvement and select which parameters to tune accordingly. To this end, in some embodiments, the CM analytics operation 506 can include the parameter sensitivity analysis as detailed below.

Suppose that the following data is available in the form of $\{(x_i, p_i, y_i)\}$ collected from a cell. A cell-level regression model $\hat{F}(\bullet)$ can be calibrated on this dataset such that $$y_i = \hat{F}(x_i, p_i) + \epsilon_i,$$

where $\epsilon_i$ denotes the residual term.

Suppose that there are V parameters $p_1, p_2, \ldots, p_V$ in total such that $p_i = [p_{1,i}, p_{2,i}, \ldots, p_{V,i}]$. In the regression model, each parameter is used as a feature, and the feature importance can indicate the impact of each parameter on the target KQI and which parameters are most relevant to the target KQI. Hence, feature importance can be considered as an indicator of parameter sensitivity. As a special case, if $\hat{F}(\bullet)$ is a linear regression model, the following can be expressed:

$$y_i = \hat{F}(x_i, p_i) + \epsilon_i = w_x^T x_i + w_p^T p_i + \epsilon_i,$$

where $w_x$ and $w_p$ denote the coefficient vectors for the regressor KPIs and the parameters, respectively. In this case, the sign and magnitude of a linear regression coefficient show the impact of corresponding parameters on the target KQI of interest. Hence, letting $w_p = [w_{p_1}, w_{p_2}, \ldots, w_{p_V}]$, for each parameter $p_v$, its linear regression coefficient $w_{p_v}$ indicates the parameter sensitivity. In practice, the linear regression models can be trained and the coefficients of each feature can be determined via open-source ML tools. For example, the LinearRegression( ) function in the Python scikit-learn package can be fit to the cell dataset, and the coeff_property can be retrieved for the coefficients of all features, including the parameters.

For a general regression model $\hat{F}(\bullet)$, the parameter sensitivity can be determined by changing the value of a single parameter while keeping all other factors fixed, and computing the change in the predicted target KQI. Hence, the sensitivity of a parameter $p_v$, denoted as $\beta_{p_v}$, can be determined as follows:

$$\beta_{p_v} = E_{x,p}\left[\frac{\Delta \hat{F}(x, p)}{\Delta p_v}\right] = E_{x,p_a,p_b}\left[\frac{\hat{F}(x, p_a) - \hat{F}(x, p_b)}{p_{a,v} - p_{b,v}}\right] \cong$$

$$\frac{1}{|X||P|} \sum_{x \in X} \sum_{p_a, p_b \in P} \frac{\hat{F}(x, p_a) - \hat{F}(x, p_b)}{p_{a,v} - p_{b,v}},$$

where $E[\bullet]$ is the expectation operator, and $p_b$ and $p_a$ denote pre- and post-change parameter vectors, where only the parameter $p_v$ is changed with the before value $p_{b,v}$ and after value $p_{a,v}$. Moreover, X denotes a set of regressor KPI samples, P denotes the set of $p_a$, $p_b$ pairs used in the experiment, and |•| denotes the cardinality of a set. It is noted that the procedure described for a general regression model can be applied to a linear regression model as well, and it is expected to obtain similar parameter sensitivity scores with the linear regression coefficients (i.e., $\beta_{p_v} \cong w_{p_v}$).

Figure 12:
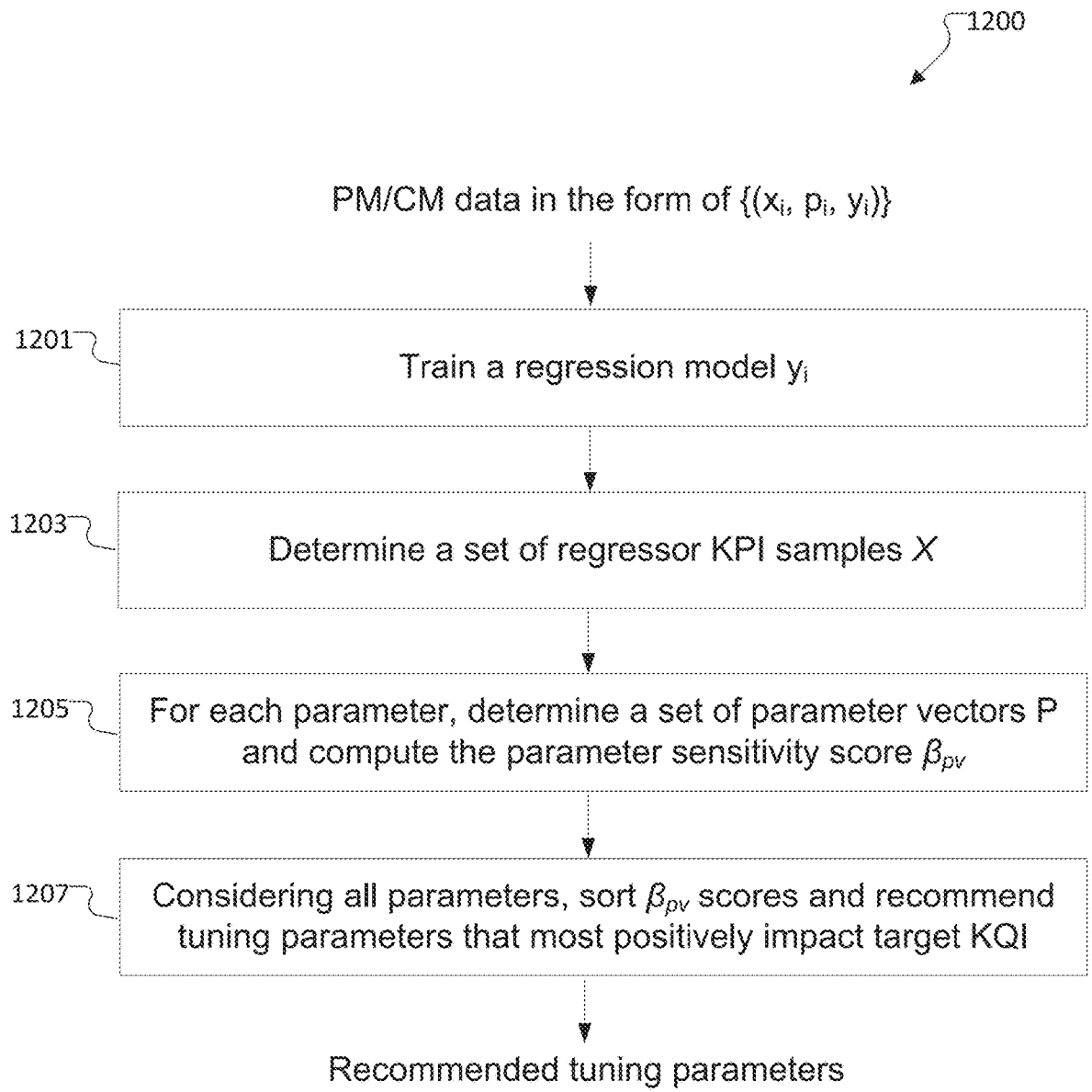
FIG. 12 illustrates an example process for recommending tuning parameters based on a parameter sensitivity analysis for a general regression model, according to embodiments of the present disclosure.

FIG. 12 illustrates an example process 1200 for recommending tuning parameters based on the parameter sensitivity analysis for a general regression model, according to embodiments of the present disclosure. As shown in FIG. 12, in step 1201, a regression model is trained, as given by the equation for $y_i$ shown above. In step 1203, a fixed set of regressor KPI samples are determined for the next step. In step 1205, the parameter sensitivity scores are computed for each parameter interest, as given by the equation for $\beta_{p_v}$ shown above. Finally, in step 1207, parameters with the most positive impact on the target KQI are recommended as the tuning parameters. For example, if the target is the DL throughput, the parameters with positive and the largest-magnitude sensitivity scores can be recommended.

Although FIGS. 4 through 12 illustrates one example of a system 400 for automatically using configuration management analytics in cellular networks and related details, various changes may be made to FIGS. 4 through 12. For example, other numbers of RANs, controllers, and user clients could be included in the system 400. Also, various components in FIG. 4 could be combined, further subdivided, or omitted and additional components could be added according to particular needs. In addition, while shown as a series of steps, various steps in FIGS. 6-8 and 10-12 could overlap, occur in parallel, occur in a different order, or occur any number of times.

Figure 13:
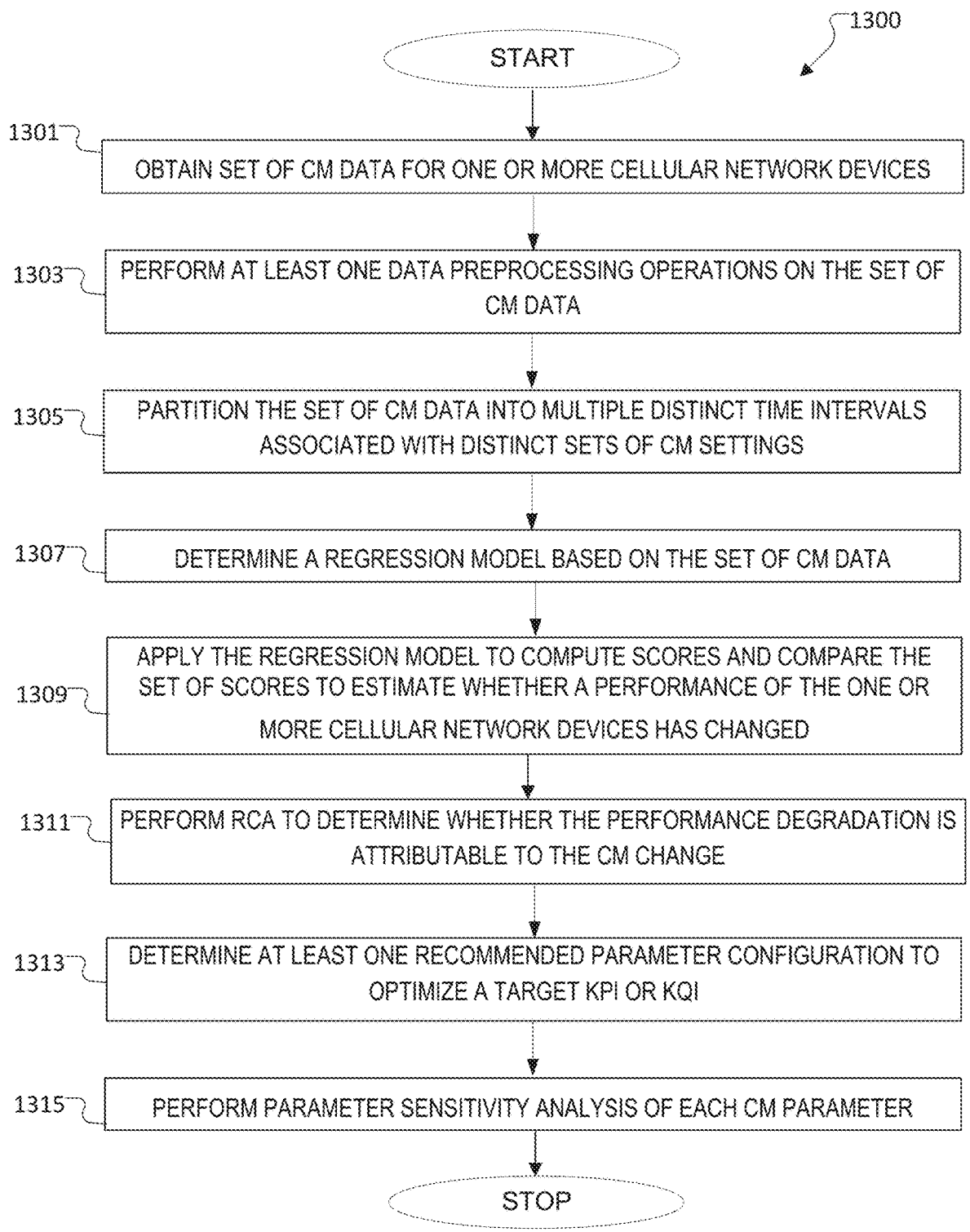
FIG. 13 illustrates a flow chart of a method for automatically using configuration management analytics in cellular networks according to embodiments of the present disclosure.

FIG. 13 illustrates a flow chart of a method 1300 for automatically using configuration management analytics in cellular networks according to embodiments of the present disclosure. In some embodiments, the method 1300 may be performed by a network device (e.g., a data center, a local central office, a BS, or the like) operating an AI engine (e.g., the AI engine 410 as illustrated in FIG. 4). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1301. At step 1301, the AI engine obtains a set of CM data for one or more cellular network devices, where the CM data includes multiple CM parameters. This could include, for example, the AI engine 410 performing the data loading operation 502 to obtain a set of CM data for the CN 402, the RAN 404, or the like.

At step 1303, the AI engine performs at least one of multiple data preprocessing operations on the set of CM data. This could include, for example, the AI engine 410 performing the data preprocessing/feature engineering operation 504, which can include (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices, and the like.

At step 1305, the AI engine partitions the set of CM data into multiple distinct time intervals, where each time interval is associated with a distinct set of CM settings at the one or more cellular network devices. This could include, for example, the AI engine 410 partitioning the set of CM data into before and after intervals, such as described with respect to the process 800.

At step 1307, the AI engine determines a regression model based on the set of CM data. This could include, for example, the AI engine 410 determining a cell level regression model, such as described with respect to the process 1000.

At step 1309, the AI engine applies the regression model to compute a distinct set of scores and compare the set of scores to estimate whether a performance of the one or more cellular network devices has changed during a second time interval relative to a first time interval. This could include, for example, the AI engine 410 performing the CM analytics operation 506 and detecting if there is performance degradation after a configuration change, such as described with respect to the process 800.

At step 1311, in response to estimating that the performance of the one or more cellular network devices has degraded during the second time interval, the AI engine performs RCA to determine whether the performance degradation is attributable to the CM change. This could include, for example, the AI engine 410 performing the CM analytics operation 506 and operation 805 to perform the RCA.

At step 1313, the AI engine determines at least one recommended parameter configuration to optimize a target KPI or KQI. This could include, for example, the AI engine 410 AI engine 410 performing the CM analytics operation 506 and the process 1000 to recommend parameter values.

At step 1315, the AI engine performs parameter sensitivity analysis, including computing a respective sensitivity of each CM parameter of the set of CM data based on an average impact of that CM parameter on the target KPI or KQI while maintaining at least some other factors. This could include, for example, the AI engine 410 performing the CM analytics operation 506 and the process 1200 to determine parameter sensitivity scores.

Although FIG. 13 illustrates one example of a method 1300 for automatically using configuration management analytics in cellular networks, various changes may be made to FIG. 13. For example, while shown as a series of steps, various steps in FIG. 13 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
partitioning a set of configuration management (CM) data for one or more cellular network devices into multiple distinct time intervals, each time interval associated with a distinct set of CM settings at the one or more cellular network devices, the CM data comprising multiple CM parameters;
determining a regression model based on the set of CM data; and
applying the regression model to compute a distinct set of scores and compare the set of scores to estimate whether a performance of the one or more cellular network devices has changed during a second time interval relative to a first time interval.

2. The method of claim 1, further comprising:
in response to estimating that the performance of the one or more cellular network devices has degraded during the second time interval, performing root cause analysis (RCA) including statistically analyzing behavior of a network cell before and after a CM change to determine whether the degradation in the performance of the one or more cellular network devices is attributable to the CM change.

3. The method of claim 1, further comprising:
determining at least one recommended parameter configuration to optimize a target key performance indicator (KPI) or key quality indicator (KQI).

4. The method of claim 3, further comprising:
performing parameter sensitivity analysis comprising computing a respective sensitivity of each CM parameter of the set of CM data based on an average impact of that CM parameter on the target KPI or KQI while maintaining at least some other factors.

5. The method of claim 1, wherein determining the regression model comprises:
selecting one or more regressor key performance indicators (KPIs) for the regression model to avoid masking one or more CM parameter effects.

6. The method of claim 1, further comprising:
performing at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

7. The method of claim 1, wherein the regression model comprises a one-group regression or a two-group regression.

8. A device comprising:
a transceiver configured to transmit and receive information; and
a processor operably connected to the transceiver, the processor configured to:
partition a set of configuration management (CM) data for one or more cellular network devices into multiple distinct time intervals, each time interval associated with a distinct set of CM settings at the one or more cellular network devices, the CM data comprising multiple CM parameters;
determine a regression model based on the set of CM data; and
apply the regression model to compute a distinct set of scores and compare the set of scores to estimate whether a performance of the one or more cellular network devices has changed during a second time interval relative to a first time interval.

9. The device of claim 8, wherein the processor is further configured to:
in response to estimating that the performance of the one or more cellular network devices has degraded during the second time interval, perform root cause analysis (RCA) including statistically analyzing behavior of a network cell before and after a CM change to determine whether the degradation in the performance of the one or more cellular network devices is attributable to the CM change.

10. The device of claim 8, wherein the processor is further configured to:
determine at least one recommended parameter configuration to optimize a target key performance indicator (KPI) or key quality indicator (KQI).

11. The device of claim 10, wherein the processor is further configured to:
perform parameter sensitivity analysis in which the processor computes a respective sensitivity of each CM parameter of the set of CM data based on an average impact of that CM parameter on the target KPI or KQI while maintaining at least some other factors.

12. The device of claim 8, wherein to determine the regression model, the processor is further configured to:
select one or more regressor key performance indicators (KPIs) for the regression model to avoid masking one or more CM parameter effects.

13. The device of claim 8, wherein the processor is further configured to:
perform at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

14. The device of claim 8, wherein the regression model comprises a one-group regression or a two-group regression.

15. A non-transitory computer readable medium comprising program code that, when executed by a processor of a device, causes the device to:
partition a set of configuration management (CM) data for one or more cellular network devices into multiple distinct time intervals, each time interval associated with a distinct set of CM settings at the one or more cellular network devices, the CM data comprising multiple CM parameters;
determine a regression model based on the set of CM data; and
apply the regression model to compute a distinct set of scores and compare the set of scores to estimate whether a performance of the one or more cellular network devices has changed during a second time interval relative to a first time interval.

16. The non-transitory computer readable medium of claim 15, further comprising program code that, when executed by the processor of the device, causes the device to:
in response to estimating that the performance of the one or more cellular network devices has degraded during the second time interval, perform root cause analysis (RCA) including statistically analyzing behavior of a network cell before and after a CM change to determine whether the degradation in the performance of the one or more cellular network devices is attributable to the CM change.

17. The non-transitory computer readable medium of claim 15, further comprising program code that, when executed by the processor of the device, causes the device to:
determine at least one recommended parameter configuration to optimize a target key performance indicator (KPI) or key quality indicator (KQI).

18. The non-transitory computer readable medium of claim 17, further comprising program code that, when executed by the processor of the device, causes the device to:
perform parameter sensitivity analysis in which the processor computes a respective sensitivity of each CM parameter of the set of CM data based on an average impact of that CM parameter on the target KPI or KQI while maintaining at least some other factors.

19. The non-transitory computer readable medium of claim 15, wherein the program code that causes the device to determine the regression model comprises program code that causes the device to:
select one or more regressor key performance indicators (KPIs) for the regression model to avoid masking one or more CM parameter effects.

20. The non-transitory computer readable medium of claim 15, further comprising program code that, when executed by the processor of the device, causes the device to:
perform at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

* * * * *